March 1, 1938. J. T. DALTON 2,109,988
ENVELOPE FILLING AND CLOSING MACHINE
Filed April 12, 1935 11 Sheets-Sheet 1

Inventor
John T. Dalton
By Norris & Bateman
Attorneys

March 1, 1938. J. T. DALTON 2,109,988
ENVELOPE FILLING AND CLOSING MACHINE
Filed April 12, 1935 11 Sheets-Sheet 2

March 1, 1938.   J. T. DALTON   2,109,988
ENVELOPE FILLING AND CLOSING MACHINE
Filed April 12, 1935   11 Sheets-Sheet 3

John T. Dalton, Inventor
By Norris & Bateman, Attorneys

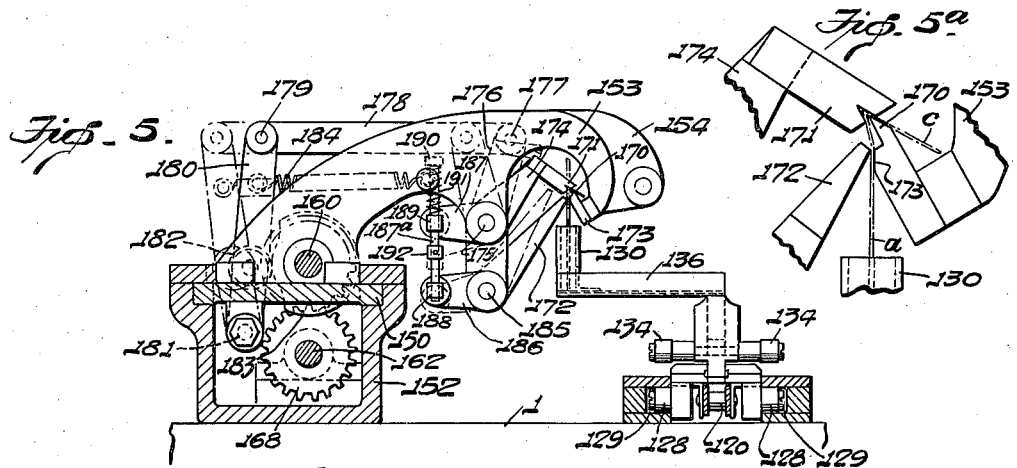
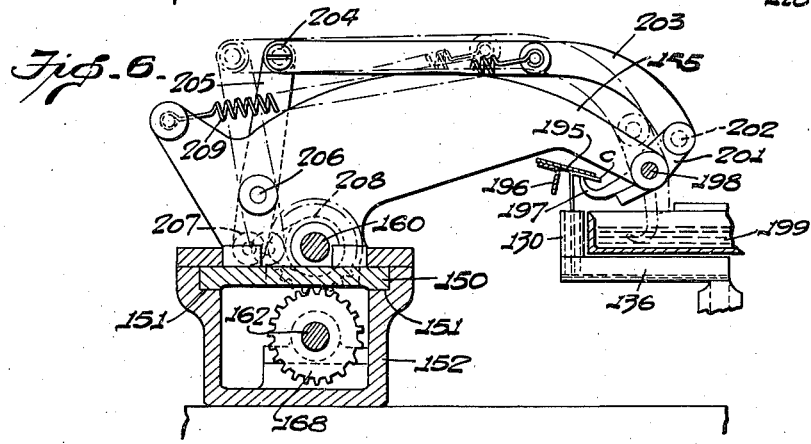
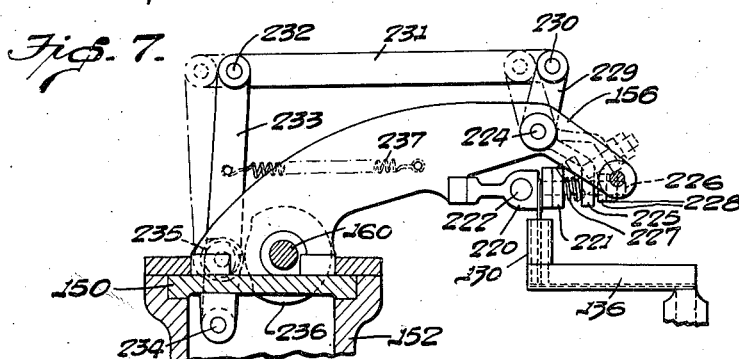
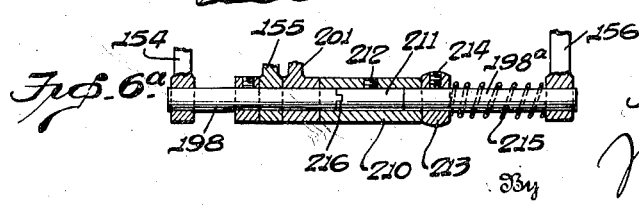

Inventor
John T. Dalton
By Norris & Bateman
Attorneys

March 1, 1938.    J. T. DALTON    2,109,988
ENVELOPE FILLING AND CLOSING MACHINE
Filed April 12, 1935    11 Sheets-Sheet 6

Inventor
John T. Dalton
By Norris & Bateman
Attorneys

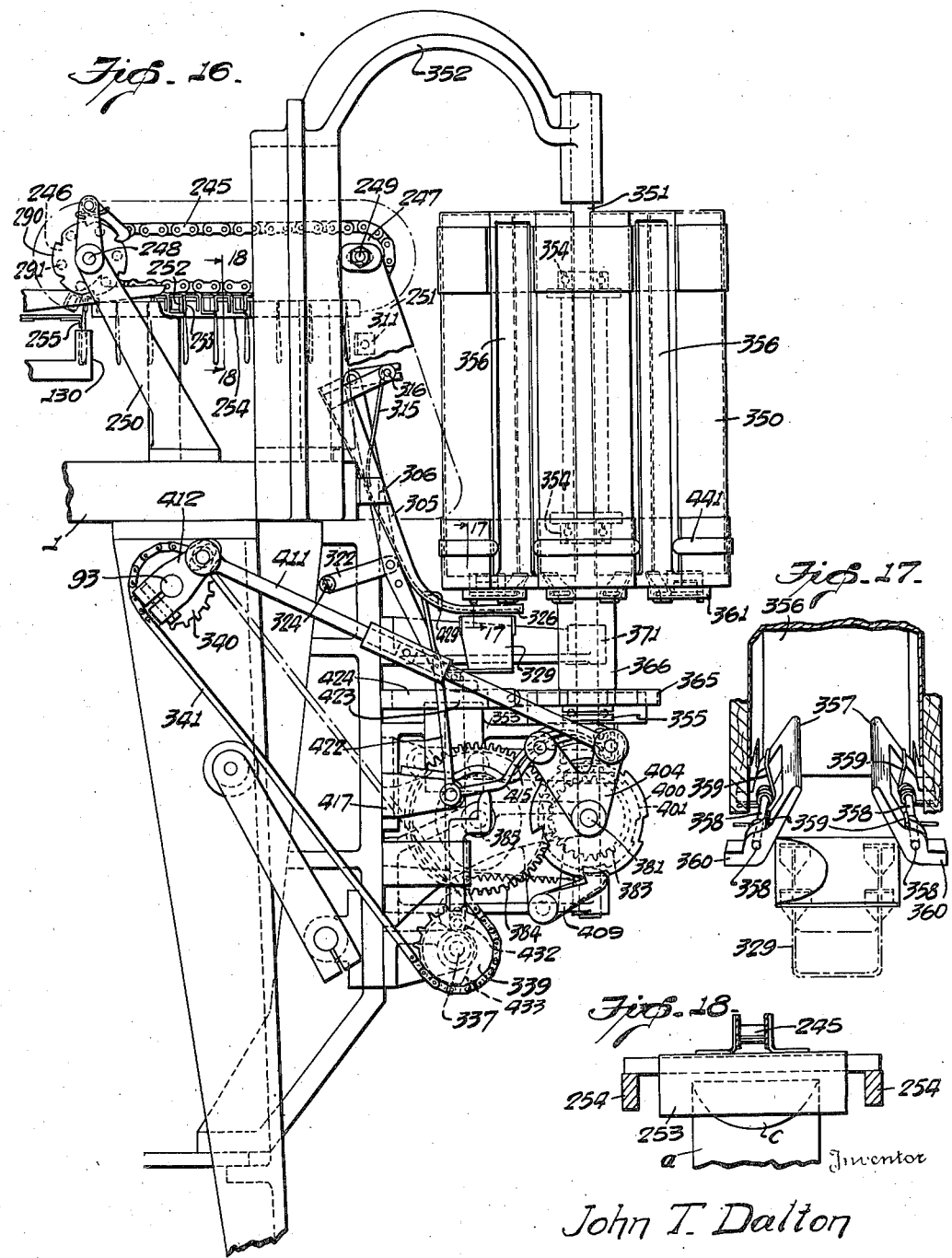

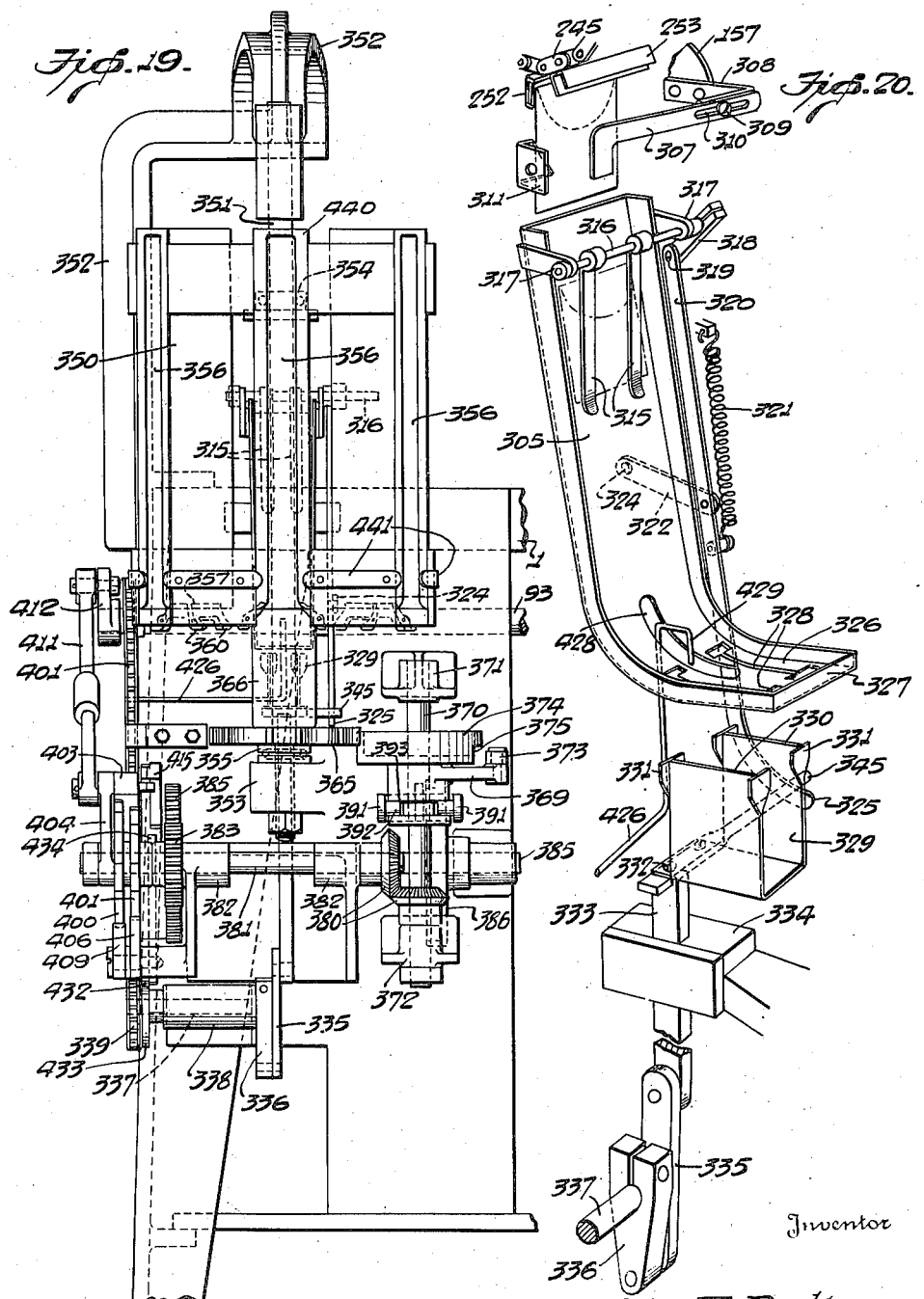

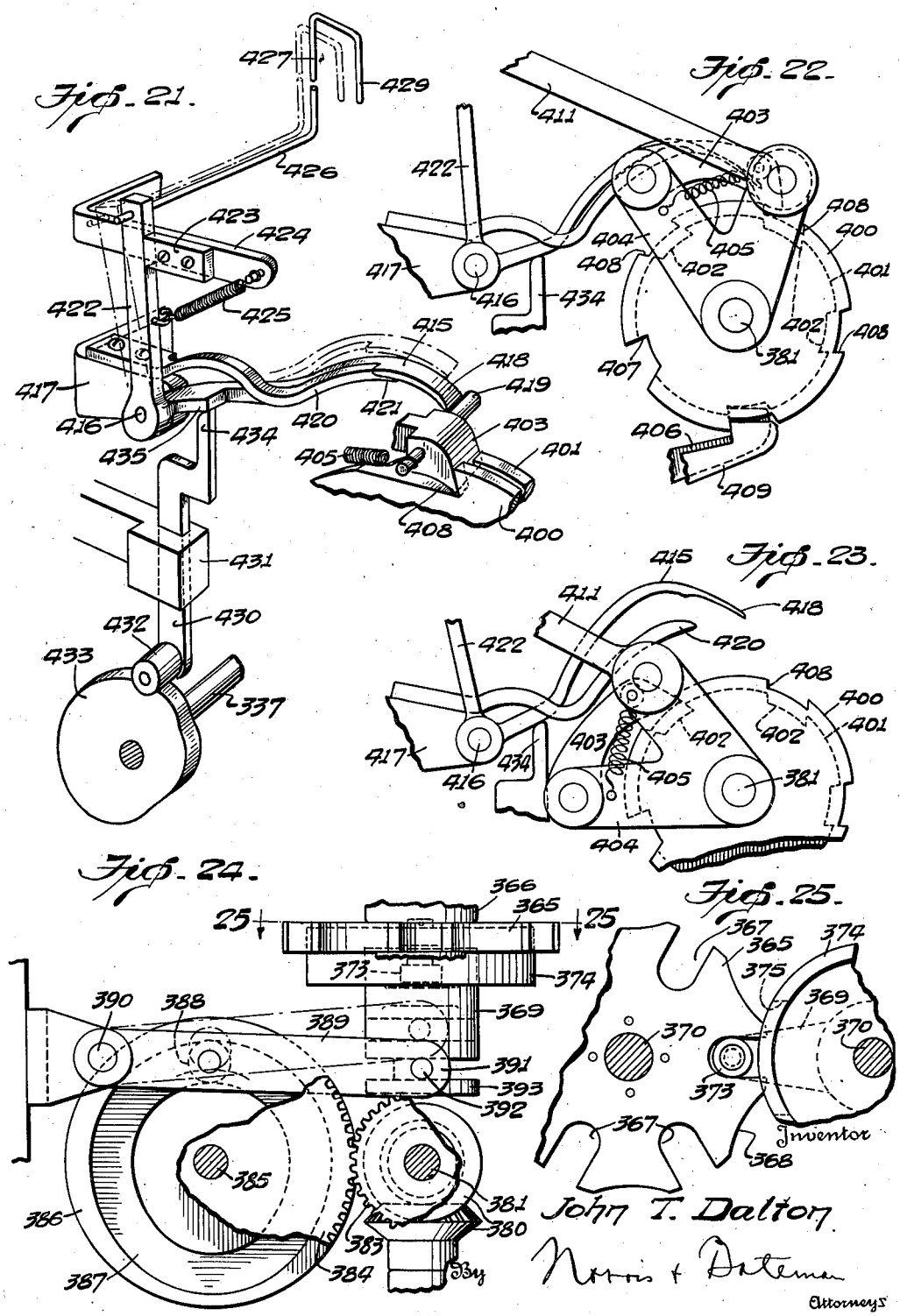

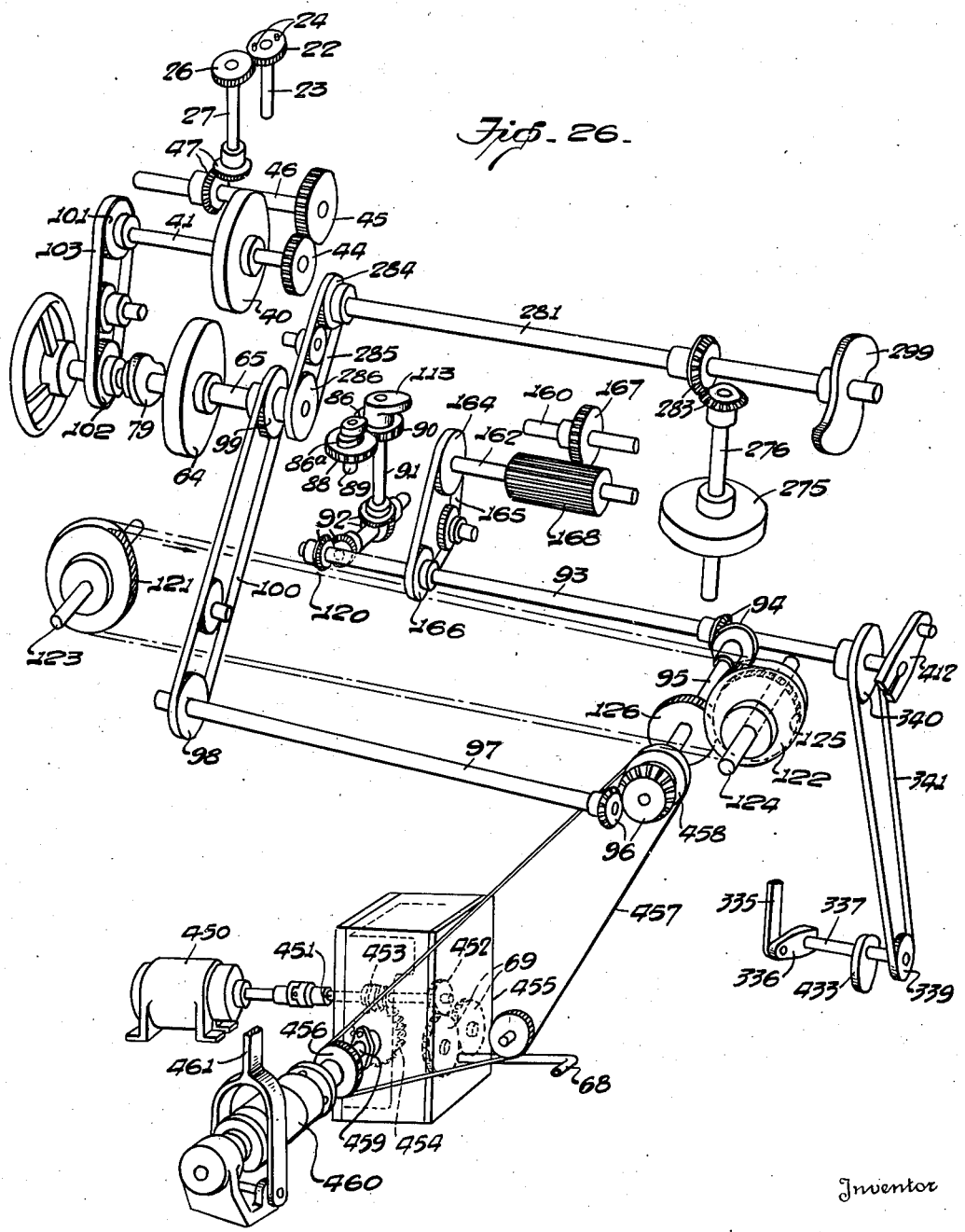

March 1, 1938. J. T. DALTON 2,109,988
ENVELOPE FILLING AND CLOSING MACHINE
Filed April 12, 1935 11 Sheets-Sheet 11
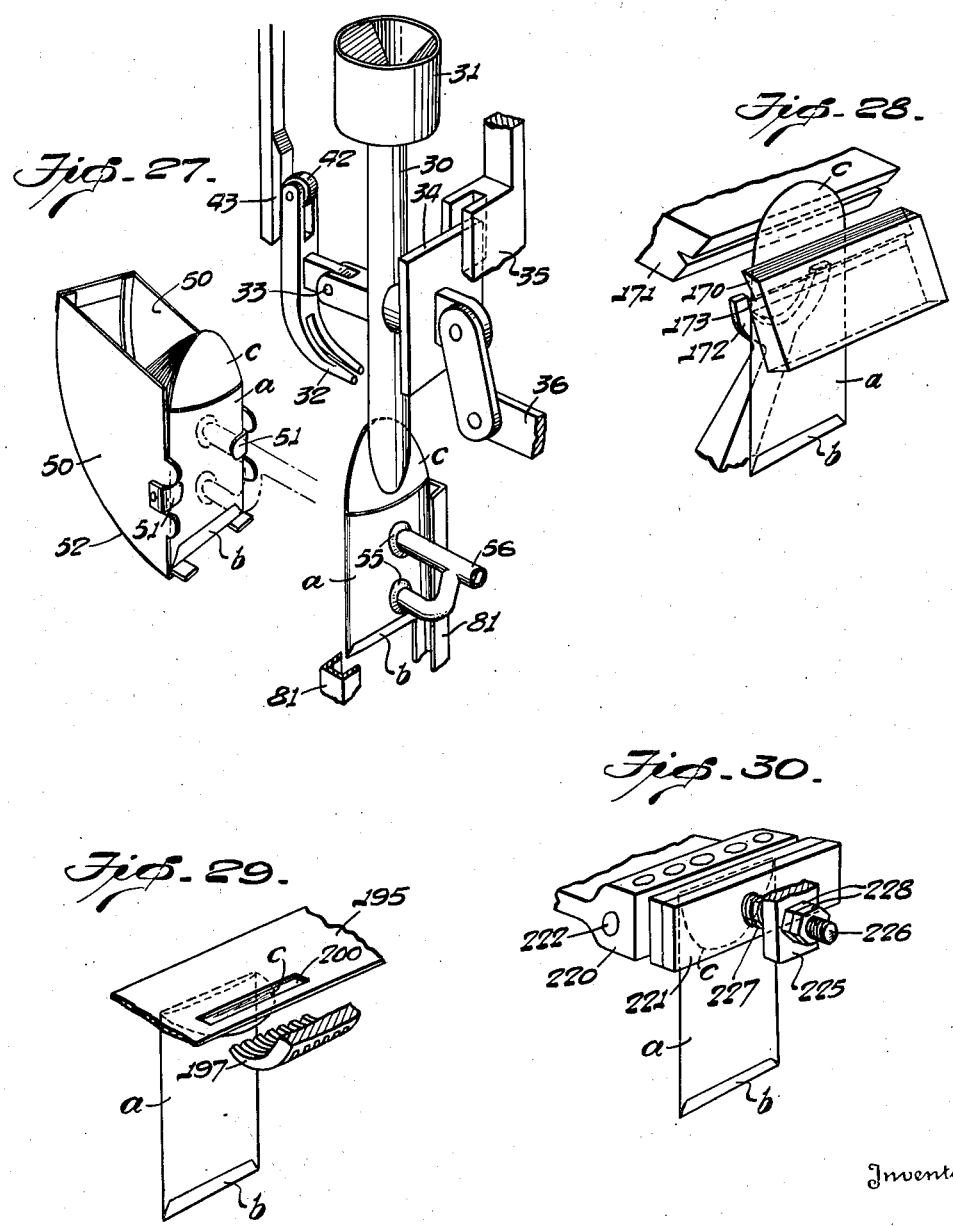
Inventor
John T. Dalton
By Norris & Bateman
Attorneys Patented Mar. 1, 1938

2,109,988

UNITED STATES PATENT OFFICE 2,109,988

ENVELOPE FILLING AND CLOSING MACHINE

John T. Dalton, Durham, N. C., assignor to Wright-Dalton Machinery Company, Durham, N. C., a corporation of North Carolina Application April 12, 1935, Serial No. 16,092

14 Claims. (Cl. 226—49)

The present invention relates to machines for packaging articles, and more particularly to the inclosing of pills and similar articles in envelopes and similar containers.

One of the primary objects of the invention is to provide novel and improved means for counting a predetermined number of pills or the like and discharging the counted number thereof into an envelope or container.

Another object is to provide counting means of this kind which may be readily adapted for the counting of pills or the like of different numbers or sizes.

Another object is to provide novel and improved means for presenting envelopes in open condition in position to receive the pills or the like, and for folding, gumming and sealing the closing flaps thereof.

Another object is to provide novel and improved means for counting the filled envelopes and introducing a predetermined accurately counted number thereof into each of a number of pockets in a magazine from which the counted and filled envelopes may be removed for packing and shipment or storage.

To these and other ends the invention consists in certain improvements and combinations and arrangements of parts all as will be hereinafter more fully described, the features of novelty being pointed out particularly in the claims at the end of this specification.

Figure 1:
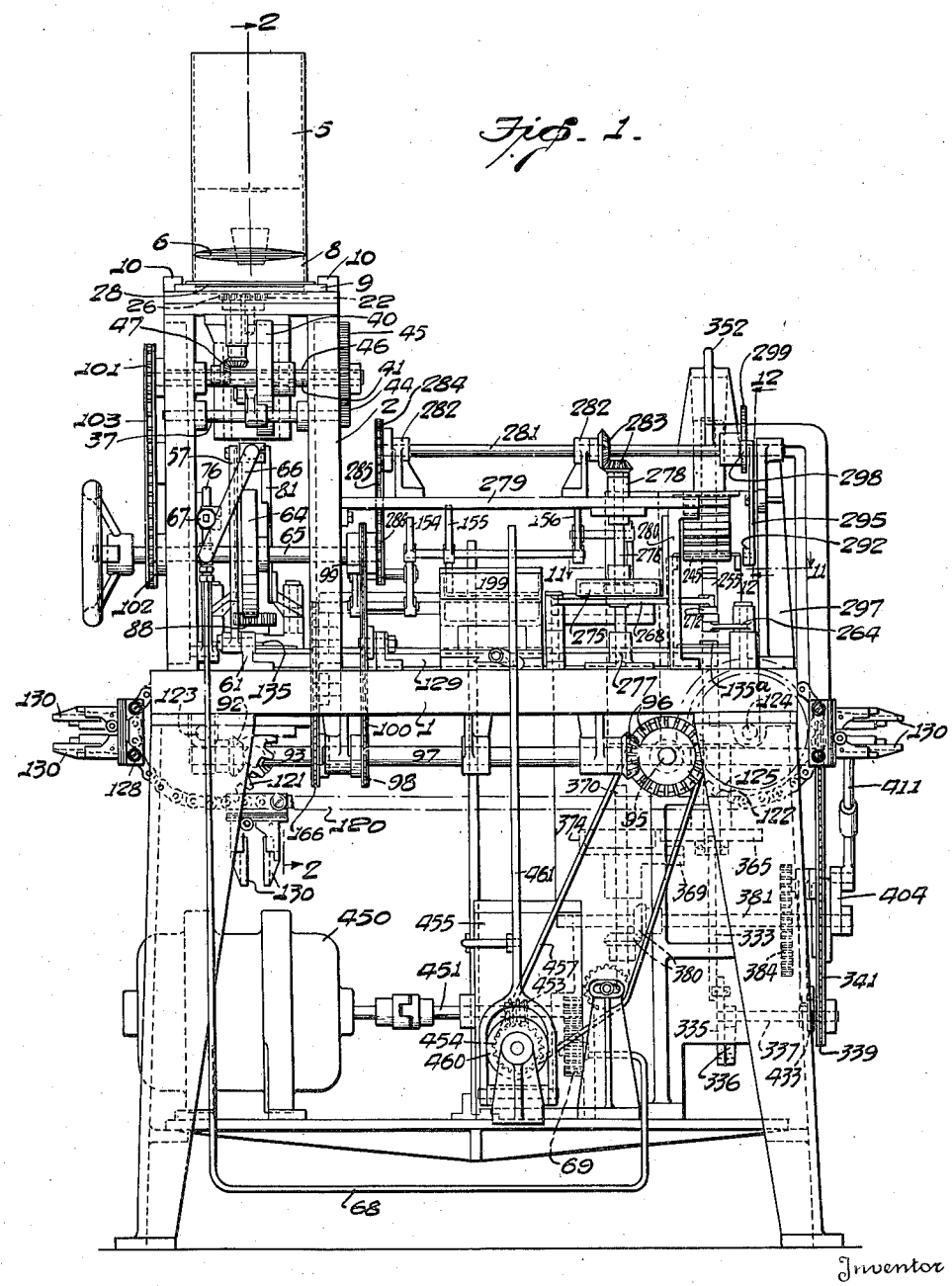
Figure 1 is a front elevation of a pill counting and envelope filling machine constructed in accordance with the preferred embodiment of the present invention.
Figure 2:
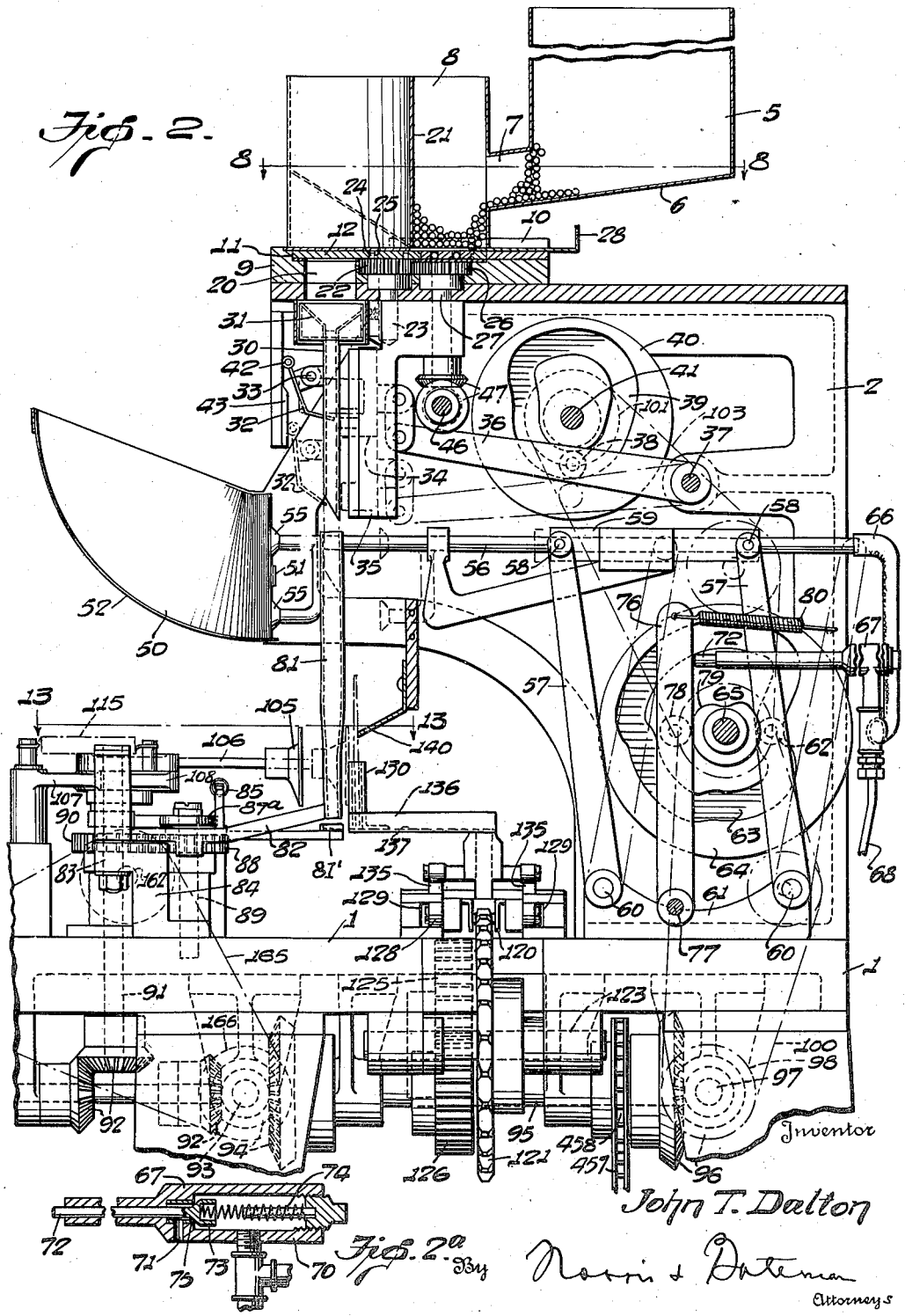
Figure 2 is a vertical section through the pill counting and envelope feeding means and adjacent parts of the machine, the sections being taken on the line 2—2 in Fig. 1, looking in the direction of the arrows.
Figure 3:
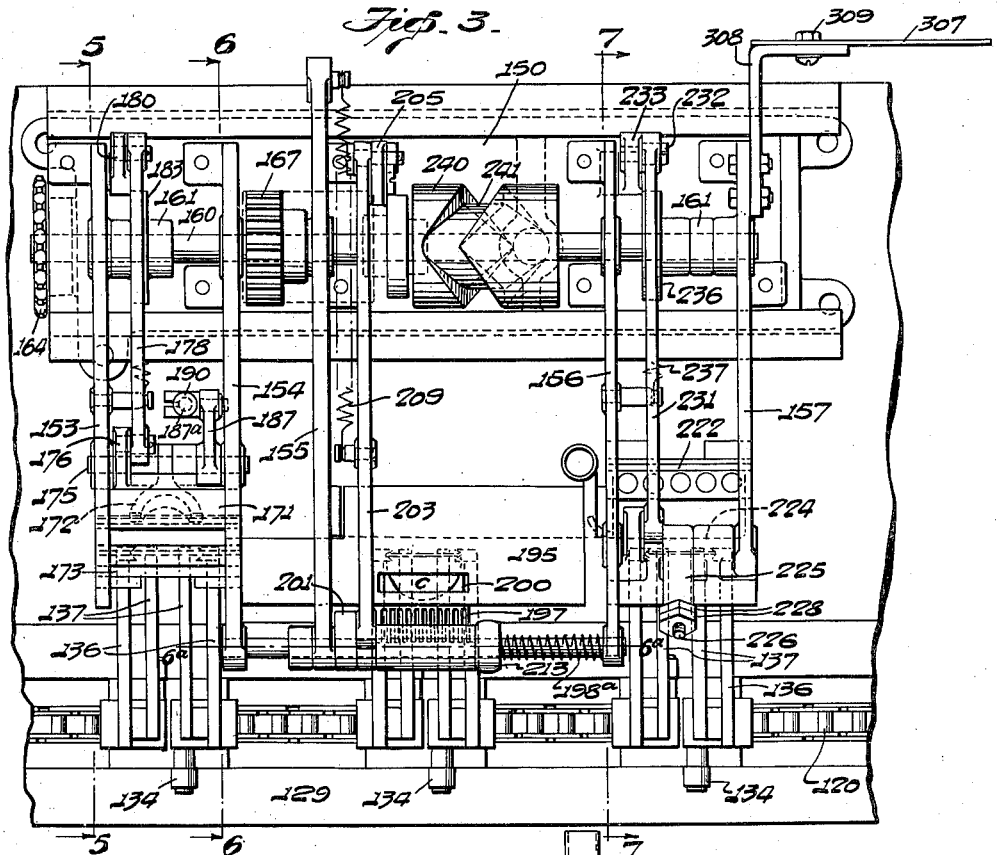
Figure 4:
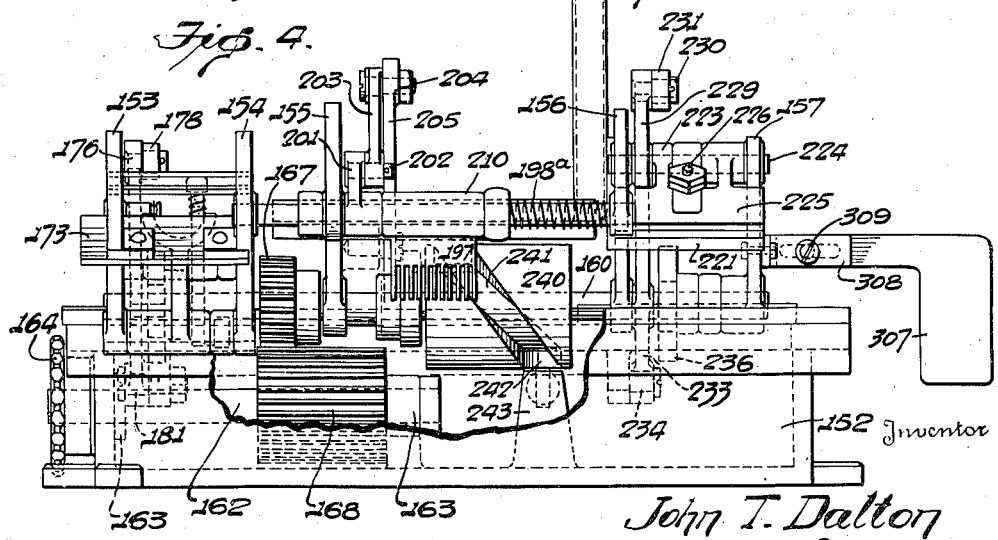
Figure 8:
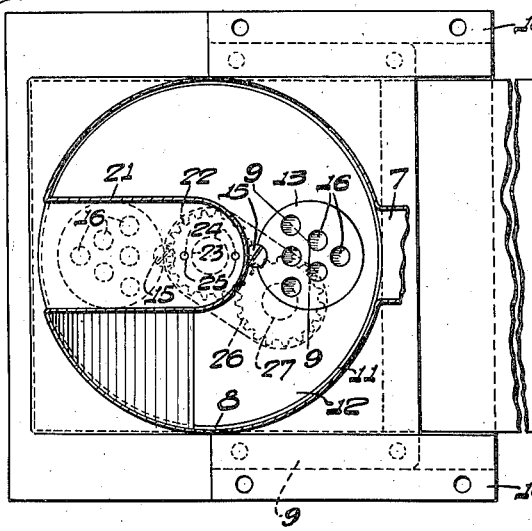
Figure 9:
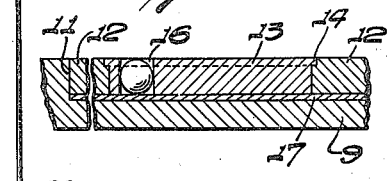
Figure 10:
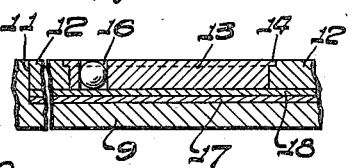
Figure 11:
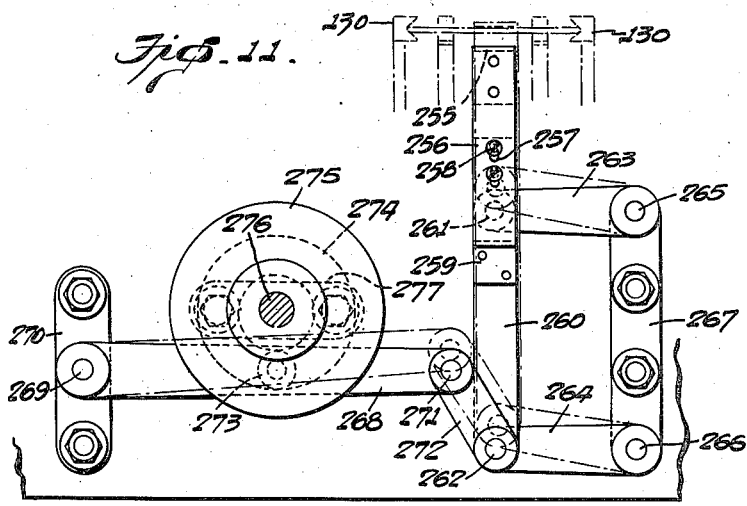
Figure 12:
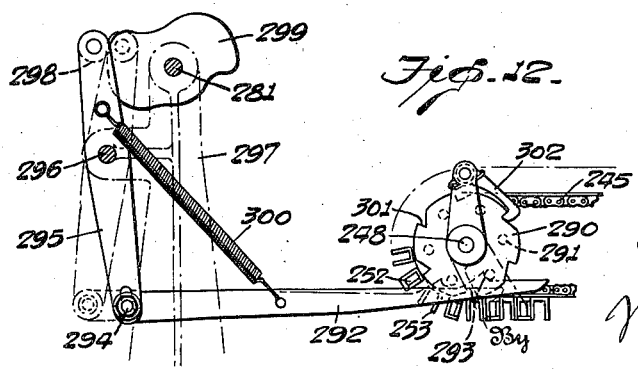
Figure 13:
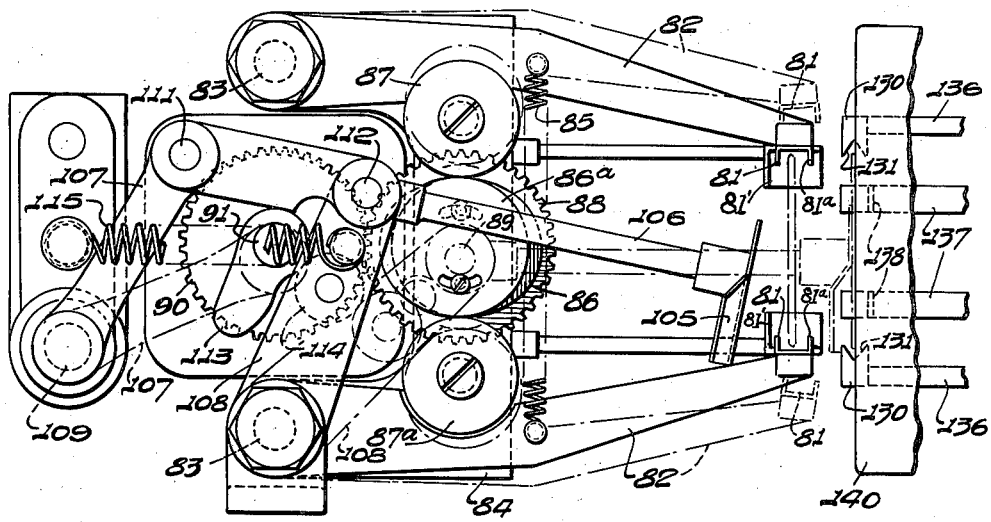
Figure 14:
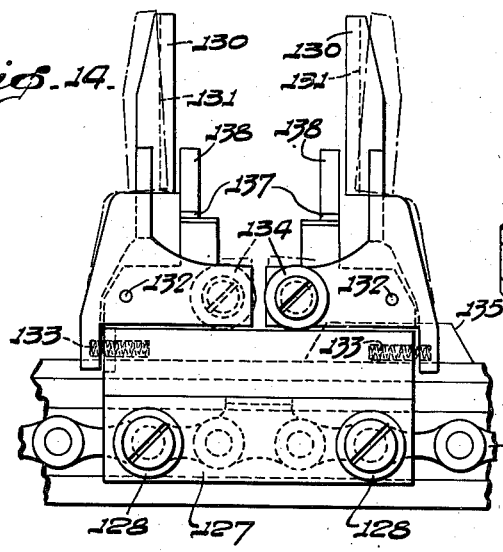
Figure 15:
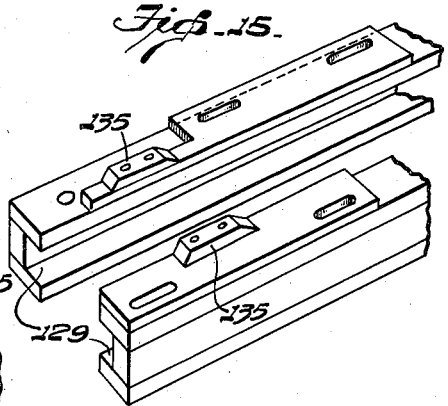

Figure 2ª is an enlarged detail sectional view of the control for the envelope feeding vacuum cups;

Figure 3 is a top plan view on an enlarged scale, of the envelope flap folding, gumming and sealing devices;

Figure 4 is an elevation of the structure shown in Fig. 3 as viewed from the lower side of said figure;

Figure 5 is a transverse vertical section taken on the line 5—5 in Fig. 3 and looking in the direction of the arrows, showing the envelope flap folding mechanism;

Figure 5ª is a detail view on an enlarged scale of the flap crimping or folding devices;

Figure 6 is a transverse vertical section taken on the line 6—6 in Fig. 3 and looking in the direction of the arrows, showing the envelope flap gumming mechanism;

Figure 6ª is a section on an enlarged scale taken on the line 6ª—6ª in Fig. 3;

Figure 7 is a transverse vertical section taken on the line 7—7 in Fig. 3 and looking in the direction of the arrows, showing the envelope flap sealing mechanism;

Figure 8 is a horizontal section, on an enlarged scale, through the pill feeding and counting means, taken on the line 8—8 in Fig. 2;

Figure 9 is a detailed section on an enlarged scale through the pill counting plate and its carrying disk, taken on the line 9—9 in Fig. 8, the pill counting plate being of a thickness suitable for the counting of relatively large pills;

Figure 10 is a view similar to Fig. 9 but showing a pill counting plate of a thickness suitable for counting relatively smaller pills;

Figure 11 is a horizontal section on an enlarged scale, taken on the line 11—11 in Fig. 1, showing the ejector for removing the filled and closed envelopes from the conveyor to a carrier which advances them to the counting and stacking means;

Figure 12 is a vertical section, on an enlarged scale, taken on the line 12—12 in Fig. 1 and looking in the direction of the arrows, showing the means for actuating the carrier for the filled envelopes;

Figure 13 is a horizontal section, on an enlarged scale, taken on the line 13—13 in Fig. 2, showing the ejector for transferring the envelopes, after receiving the pills or other articles, to the traveling conveyor at a point in advance of the envelope flap folding, gumming and sealing devices;

Figure 14 is a detail view on an enlarged scale, showing one of the envelope holders and a portion of the conveyor which advances it;

Figure 15 is a detail perspective view of the rails along which the conveyor travels, showing the cams for opening the holders;

Figure 16 is an elevation of a portion of the right hand end of the machine as shown in Fig. 1, illustrating the means for counting the filled envelopes, the magazine to receive them, and means for introducing the filled envelopes into the magazine;

Figure 17 is a detail vertical section, on an enlarged scale, taken on the line 17—17 of Fig. 16 and looking in the direction of the arrows, showing the means for introducing the filled envelopes into a chamber or pocket of the magazine and the means for retaining a stack of filled envelopes therein;

Figure 18 is a transverse vertical section through the filled envelope carrier, on an enlarged scale, taken on the line 18—18 in Fig. 16;

Figure 19 is an elevation of the structure shown in Fig. 16 as viewed from the right in that figure;

Figure 20 is a detail perspective view of the mechanism for receiving the filled envelopes from the carrier, and feeding them to the means for introducing them into the magazine;

Figure 21 is a detail perspective view of the mechanism which controls the counting mechanism according to the presence or absence of a filled envelope;

Figure 22 is an elevation of a portion of the mechanism shown in Fig. 21, showing the counting mechanism set in inoperative or non-counting condition, as when a filled envelope is absent or not presented for introduction into the magazine;

Figure 23 is a view similar to Fig. 22 but showing the counting mechanism in normal or counting condition as when a filled envelope is present for introduction into the magazine;

Figure 24 is a detail view, partly in elevation and partly in section and on an enlarged scale, showing the mechanism for rotating the magazine to bring the envelope receiving chambers or pockets therein successively into envelope receiving position;

Figure 25 is a horizontal section taken on the line 25—25 in Fig. 24;

Figure 26 is a perspective view showing the driving means for the various elements of the machine;

Figure 27 is a perspective view of an envelope held in open position to receive a counted number of pills or other articles;

Fig. 28 is a perspective view of an envelope showing the manner in which the closing flap thereof is folded;

Figure 29 is a perspective view of the envelope showing the manner in which the gum or paste is applied to its closing flap for sealing it; and Figure 30 is a perspective view of the filled and sealed envelope.

Similar parts are designated by the same reference characters in the different figures.

The present invention provides a machine capable of rapidly counting the pills or other similar small or pellet like articles, for feeding envelopes or similar containers, in open condition into position to each receive a counted number of the pills or articles, and for folding, gumming and sealing the closing flaps of the envelopes while the filled envelopes are advanced continuously in the machine. The machine also embodies means for carrying the filled and sealed envelopes, while maintained in sealed condition, to a magazine in which they are stacked, means being provided for counting the actual number of filled envelopes stacked in the magazine, and the magazine having a plurality of chambers or pockets therein, each adapted to stack a predetermined counted number of the filled envelopes therein, means being provided for automatically bringing another chamber in the magazine into envelope receiving position when a preceding chamber therein has received a predetermined counted number of the filled envelopes.

The preferred embodiment of the invention is shown in the present instance as applied to the counting and insertion of pills into envelopes, but it will be apparent that the invention is not restricted thereto or to the particular construction of machine shown since the machine may be employed for other similar purposes and constructions equivalent to that shown may be employed and such will be included within the scope of the claim.

The machine, as shown in the present instance, comprises generally a table 1 which may rest upon legs, the table supporting a substantially upright frame 2 thereon, the table and frame providing a support upon which the various elements of the machine are mounted.

The pill feeding means comprises an open topped receptacle 5 having preferably a sloping bottom 6 leading to an outlet 7 in a side thereof, and a hopper 8 into a side of which the outlet 7 leads, so that a supply of pills or the like placed in the receptacle 5 will roll or flow by gravity into the hopper. The hopper 8 is mounted on a bottom plate 9 which is secured removably to the top of the frame 2 by clamping members 10 which may be bolted or otherwise detachably secured to the frame 2. The bottom plate 9 is formed with a circular recess 11 in which a circular disk 12 is fitted rotatably, this disk forming in effect the bottom of the hopper 8 so that the pills in the hopper will rest on this disk. The disk 12 has a suitable number of counting plates 13 removably fitted therein, the disk being shown in the present instance as provided with two counting plates located in diametrically opposite positions on the disk. Each counting plate, which is preferably circular in form and is fitted into a circular opening in the disk, is of the same thickness as the disk so that its upper and lower faces will be flush with those of the disk, and in order to facilitate the flush mounting of the counting plates in the disk, the counting plates are preferably provided near their upper surfaces with circular shoulders or flanges 14 to set in correspondingly shaped grooves or recesses in the holes in the disk, and each counting plate may be removably secured in the disk by a screw 15 threaded in the disk and having a head which overlaps an edge of the counting plate. Each counting plate is provided with holes or pockets 16 which extend entirely therethrough from its upper to its lower surface. The number of pockets or holes in each counting plate may be varied to accord with the number of pills or articles to be introduced into each envelope or container, for which purpose, counting plates having different numbers of pockets or holes therein may be fitted interchangeably into the openings in the disk.

The counting plates and the disk 12 may also be of different thicknesses to conform with pills or similar articles of different sizes. For example, in Fig. 9 the counting plate and disk are relatively thick and are suitable for the counting of relatively large pills. In this instance, the disk 12 rests directly on a circular anti-friction washer plate 17 which may rest on the bottom of the circular recess 11, and in Fig. 10 the counting plate and its carrying disk are relatively thin and adapted for the counting of relatively smaller pills or similar articles, the counting plate and disk in this instance resting on a plate 18 which is interposed between the disk 12 and plate 17 to compensate for the reduced thickness of the disk and support the upper surface of the thinner disk at the same level as that at which the upper surface of a relatively thicker disk is supported. Thus by interchangeably fitting disks and counting plates of different thicknesses in the bottom of the hopper using the additional plate 18 when a relatively thin disk is used, the machine may be readily adapted to the counting of pills or similar articles of different sizes.

Since the upper sides of the disk 12 and counting plates 13 will be exposed within the hopper 8, pills therein will enter and fill the pockets 16 in the counting plates, and the pills contained in the counting plates will discharge by gravity therefrom when the disk rotates into a position to bring each counting plate above a discharge opening 20 formed in the bottom plate 9 and plate 17 and also plate 18 when such is employed. The portion of the hopper 8 above the discharge opening 20 is separated from the remainder of the hopper by a partition plate 21, so that as each counting plate reaches a position above the discharge opening 20, it will discharge the pills contained therein but pills contained in the rest of the hopper will be prevented from passing directly through the counting plate into the discharge opening. The disk 12 is rotated continuously during the operation of the machine by a gear 22 supported rotatably by a stub shaft 23 journalled in a vertical bearing in the top of the frame 2, this gear having a pair of pins 24 on its upper side to engage in a pair of apertures 25 formed in the center of the disk, these pins and apertures providing a driving connection between the disk and the gear 22 which enables different disks to be applied interchangeably and these pins and apertures will compensate for the use of disks of different thicknesses. The gear 22 is driven from a cooperating gear 26, the latter being mounted on a vertical driving shaft 27 journalled in the frame 2. In order to interrupt the feeding of pills, should such become desirable while the machine is being operated for adjusting or other purposes, a cut-off slide 28 is fitted to operate in a recess in the bottom plate 20 so that it will slide over the top of the disk 12 and the counting plates therein, this slide, when in closed position preventing the entrance of pills from the hopper 8 into the pockets in the counting plates. The removable mounting of the hopper enables one disk 12 to be substituted for another or the counting plates in a disk to be replaced by others of different thickness for pills of a different size or counting plates having a different number of pockets therein for counting pills of different numbers.

The pill counting means described operates to discharge a counted number of pills into the discharge opening 20 each time a counting plate is brought into position above this opening by the rotation of the disk, and means is provided to receive each counted number of pills and to hold them in the form of a charge ready for introduction into an envelope. In the present instance, a filling tube 30 is mounted beneath the discharge opening 20 for this purpose, this tube having a hopper 31 at its upper end positioned beneath the opening 20 to receive the pills therefrom, and the tube carries a gate or trigger 32 which is pivoted thereon at 33 and has an end which is movable through an opening in a side of the tube into a position within the tube to intercept and hold the pills discharged into the tube. The tube is mounted to reciprocate vertically so that it may be lowered into an opened envelope when the same is placed in filling position beneath it, the tube being mounted for this purpose on a slide 34 which is reciprocable in a vertical guide 35, which is fixed to the frame 2, the slide being operatively connected to a lever 36 which is pivoted at 37 on the frame 2, said lever carrying a roller 38 which operates in a groove 39 of appropriate form in a cam 40, the latter being fixed on a shaft 41 journalled in suitable bearings in the frame 2. The trigger or gate 32 carries a roller 42 which is arranged to ride on a stationary cam 43 mounted in fixed position on the frame 2, so that while the tube 30 in its raised position, the gate 32 will be in its closed position within the tube to intercept and hold pills introduced into the tube, and when the tube 30 is lowered, the roller 42 riding on the cam 43 will retract the gate 32 from the tube and thereby release the pills so that they may drop by gravity into the envelope. While in the present instance, two counting plates are carried by the rotating disk of the pill counting device so that a counted number of pills will be discharged into the tube 30 at each half revolution of the disk, the cam 40 is driven so that it will make one revolution for each half revolution of the disk, the shaft 41 of this cam being provided for this purpose with a gear 44 which is fixed thereon and meshes with a gear 45 of twice its diameter fixed on a shaft 46 which is suitably journalled in the frame 2, the shaft 46 being connected by equal size bevel gears 47 to the drive shaft 27 for the disk 12, as shown in Fig. 26.

The envelopes into which the pills are to be introduced may be of an ordinary well-known form as shown in Fig. 27, comprising a flat body $a$ of paper or other suitable material, closed at the bottom by a closing flap $b$ which is lapped and pasted against the body, and a closing flap $c$, this flap however being in its open or unfolded condition when the envelopes are supplied to the machine. An envelope magazine 50 is mounted on the frame 2 of the machine to receive a supply of the envelopes, the envelopes being placed therein with their unfolded closing flaps uppermost, the magazine having an opening therein for the discharge of the envelopes while in vertical position and having fingers 51 turned inwardly from its opposite sides to retain the envelopes in the magazine as the envelopes are fed toward the discharge opening by gravity descent over a curved bottom 52.

The envelopes are removed one at a time from the magazine and are brought successively into filling position beneath the filling chute 30, by suitable envelope feeding means. Such means consists preferably of a pair of suction cups 55 which are carried by a tube 56, this tube being mounted on parallel links 57 the upper ends of which are pivoted at 58 to a frame 59 which carries the tube 56 and being pivoted at 60 to a bracket 61 which is fixed to the table 1, these links supporting the tube 56 and the suction cups 55 thereon for reciprocating movement toward and from the envelope magazine. One of the links 57 carries a roller 62 which operates in a groove 63 of appropriate form in a cam 64, this cam being mounted on a shaft 65 which is journalled in suitable bearings in the frame 2. The cam groove 63 is of such shape that during each revolution of the cam 64 the suction cups 55 will be advanced to engage the foremost envelope in the magazine, then retracted to an extent that will bring the envelope attached to the suction cups into a position beneath the filling tube 30, the retraction of the suction cups being then interrupted to provide a pause during which the pills may be introduced into the envelope, after which the suction cups are withdrawn into fully retracted position, as indicated by the dotted lines in Fig. 2 and they remain in such retracted position until further rotation of the cam advances them for removal of another envelope from the magazine. After the suction cups have presented an envelope beneath the filling tube 30 and before the suction cups are withdrawn to their fully retracted position, the suction on the suction cups is released, the envelope being then held by a pair of grippers, as will be hereinafter described. The suction is created at the suction cups by a hose 66 which is connected through a valve 67 and pipe 68 to a suitable suction or vacuum pump 69, the suction pump shown being of the same construction as that disclosed in my prior application Serial No. 719,393 filed April 6, 1934. The suction control valve 67 may be of the same construction as that disclosed in my prior application Serial No. 756,355 filed December 6, 1934, it comprising a casing 70 having a vent 71 to the atmosphere and containing a plunger 72, the inner end of which is provided with a valve member 73 controlling said vent, a spring 74 normally holding the valve member 73 against a valve seat 75 formed in the valve casing so as to close the vent to atmosphere. The valve 67 is mounted in fixed position on the frame 2 with its reciprocatory stem 72 in position to be engaged by a lever 76, this lever being pivoted at 77 to the stationary frame 2 and carrying a roller 78 which cooperates with a cam 79 of suitable form fixed on the shaft 65, the roller 78 being held against the cam 79 by a tension spring 80 connected to the lever 76. The cam 79 is so shaped and set on the shaft 65 that the lever 76 will be out of contact with the valve plunger 72 until after the suction cups 55 have been retracted to bring an envelope into filling position beneath the filling tube 30 and are about to be withdrawn into their fully retracted position, the cam 79 allowing the lever 76 to act on the valve plunger 72 to unseat the valve 73 and thus open the atmospheric vent 71 and thereby release the suction on the suction cups immediately prior to the final retraction of the suction cups, so that the envelope will be released from the suction cups.

As each envelope is brought by the suction cups into filling position beneath the filling tube 30 it is received at its longitudinal edges by a pair of upright guides 81, which, as shown more particularly in Fig. 13, are of channel shape in cross-section. These guides which extend vertically in parallelism are fixed at their lower ends to a pair of levers 82 which are pivoted at 83 upon a bracket 84 bolted or otherwise fixed to the table 1. The levers 82 and the guides carried thereby are simultaneously swung toward and from one another at appropriate times to hold and release respectively an envelope, by a tension spring 85 which connects said levers and tends to draw them toward one another and by a pair of cams 86 and 86ᵃ which cooperate with rollers 87 and 87ᵃ respectively, on the levers, these cams being mounted in oppositely eccentric positions on a gear 88 which is mounted on a shaft 89 supported by the bracket 84, and the gear 88 is driven from a gear 90 of equal size which is fixed on a vertical driving shaft 91. The oppositely positioned cams 86 and 86ᵃ, upon each revolution of the gear 88, will cause the arms 82 and guides 81 to move simultaneously inwardly from the dotted line position to the full position shown in Fig. 13, as the suction cups 55 withdraw an envelope from the magazine and place it beneath the filling tube 30, the guides approaching the vertical edges of the envelope, and the suction cups then draw the envelope against the inturned edges 81ᵃ of said guides, thus springing the envelope open and allowing the tube 30 to enter the opened mouth of the envelope, after which the vacuum is released on the suction cups and the envelope is allowed to drop. Further rotation of said cams simultaneously moves the guides 81 and arms 82 outwardly from the full line position to the dotted line position shown in Fig. 13. The driving shaft 91 for thus operating the guides is connected to the shaft 65 controlling the operation of the suction cups to cause the guides to operate in proper timed relationship therewith, by pairs of bevel gears 92 of equal size connecting the shaft 91 and the longitudinal shaft 93, the latter being connected by equal size bevel gears 94 to a shaft 95 mounted in suitable bearings on the under side of the table 1, the shaft 95 being connected by equal size bevel gears 96 to a shaft 97 mounted in suitable bearings on the under side of the table, and the shaft 97 being connected by sprocket gears 98 and 99 of equal size fixed on the shafts 97 and 65 respectively and a sprocket chain 100 connecting these sprocket gears, so that the shaft 91 will rotate in unison and in proper timed relation with the shaft 65 which times the operation of the suction cups. The shaft 41 which controls the ascent and descent of the filling tube 30 is also connected to operate in unison and in proper timed relation with the shaft 65 by sprocket gears 101 and 102 of equal size fixed on the shafts 41 and 65 respectively and a sprocket chain 103 which connects these sprocket gears, the shafts 41 and 65 being so set that the filling tube 30 will be in its normal elevated position until after the suction cups have brought an envelope into filling position beneath it after which the filling tube 30 will descend into the open envelope to introduce the pills or articles therein, after which the filling tube will be raised or restored to its normal elevated position.

During the filling of the envelope, the guides 81 are in their relatively closed position, thereby centering the envelope in filling position, and the envelope is supported and held in open condition by the suction action of the suction cups 55. Upon completion of the envelope filling operation, the suction action on the suction cups is broken, thereby releasing the envelope from the suction cups, the guides 81 guiding and allowing the envelope to drop edgewise and by gravity to the lower ends of said guides 81 so that it comes to rest on shelves 81' mounted in fixed positions below the lower ends of said guides, as shown in Fig. 13, and the filled envelope is then ejected from the guides 81, while the cams 86 and 86ᵃ move the guides from their full line positions outwardly to the dotted line positions, (Fig. 13) and is transferred to a passing holder on a traveling conveyor. The ejector for ejecting the filled envelope from the guides 81 comprises an ejector plate 105 mounted on a plunger 106, this plunger being carried by a pair of links 107 and 108 pivoted at 109 and 83 respectively on the bed of the machine, and pivotally connected at 111 and 112 to the plunger 106. The pivotal centers 109 and 111 of the link 107 are closer together than the pivotal centers 83 and 112 of the link 108, so that as these links swing from the full line position to the dotted line position shown in Fig.

13 the ejector plate 105 will pass between the guides 81 and in so doing will swing laterally. The ejector plate and its plunger are actuated at appropriate intervals by a cam 113 which is fixed on the shaft 91 which carries the gear 90 and cooperates with a roller 114 on the link 108, this roller being held in contact with said cam by a tension spring 115 connected to the link 108.

The filled envelopes from the guides 81 are received by the holders of a conveyor which preferably travels continuously, as in my prior application Serial No. 719,393, to which reference may be had for a detailed illustration and description of the conveyor and the envelope holders thereon. For the purposes of the present invention it is deemed sufficient to explain that the traveling conveyor comprises an endless sprocket chain 120 which passes around sprocket wheels 121 and 122 fixed on shafts 123 and 124 mounted in suitable bearings on the underside of the table, one of these shafts as for example the shaft 124 being driven continuously by a gear 125 fixed thereon and meshing with a gear 126 fixed on the shaft 95. The upper stretch of the chain travels longitudinally over the top of the table 1 and it carries a number of suitably spaced envelope holders, one of which is shown in Fig. 14, each of these holders embodying a base 127 carrying rollers 128 which travel in channel-like tracks 129 as shown in Fig. 15, these tracks being mounted on the upper side of the table as shown in Fig. 2. Each holder comprises a pair of arms 130 which are grooved vertically at their inner sides as shown at 131 in Fig. 13, these arms being pivoted on the base 127 at 132 so that they may swing toward and from one another as indicated by the dotted and full lines in Fig. 14, springs 133 acting on the arms of each holder to move them toward or into the full line position shown in Fig. 13. Each of the arms 130 carries a roller 134, these rollers being arranged to ride upon raised cams 135 located on the tracks 129 at the points in the travel of the conveyor where a filled envelope is introduced into a holder on the conveyor and where an envelope is removed from a holder on the conveyor, so that the arms of each holder as it reaches one or the other of these positions will be held in relatively open position to facilitate the reception or removal of an envelope. The arms 130 of the holders are supported in the present instance in relatively offset positions at one side of the conveyor chain, as by the laterally extending portions 136 as shown in Fig. 2. Each holder on the conveyor in the present instance is also provided with a pair of fingers 137 which project laterally from the base 127 between the arms of the holder, these fingers being provided with upstanding lugs or abutments 138 in approximate alinement with the grooves 131 in the arms of the holder.

At the point along the length of the conveyor opposite to the ejector 105 where each holder on the conveyor as it reaches such position receives a filled envelope, the conveyor tracks 129 are provided with the holder opening cams 135 which open or spread apart the holder arms 130, and assuming the holder is moving in the direction indicated by the arrow in Fig. 13, the ejector plate 105 advances and thereby removes the filled envelope from its position between the grippers 81 and introduces it between the arms 130 of the holder, the vertical edges of such envelope becoming seated in the vertical grooves 131 in the holder arms and the envelope resting at its lower edge on the fingers 137. The upstanding lugs 138 on these fingers prevent overthrow of the envelope past the arms of the holder. As soon as the holder has received an envelope and is carried beyond the ejector, the arms of the holder on the conveyor close, thereby gripping the envelope by its vertical edges for advance edgewise with the conveyor. To assist in the placing of the envelopes in the holders of the conveyor under the action of the ejector plate 105, a plate 140 may also be mounted in the frame 2 in a stationary position above the line of travel of the upper ends of the holder arms 130 to prevent overthrow of the upper portion of the envelope and to maintain the envelope in upright position.

The present invention provides novel and improved means for folding, applying adhesive to and sealing the closing flaps of the envelopes after they have been filled and while they are being advanced continuously by the conveyor, such means being shown more particularly in Figs. 3 to 7 inclusive of the drawings. According to the present invention, the envelope flap folding, gumming and sealing devices are carried by a slide which reciprocates in unison with and at one side of the traveling conveyor. The slide in the present instance comprises a plate 150 which is mounted to slide longitudinally in guides 151 formed in a casing 152 which is fixed on the top of the table 1 and extends longitudinally of and in parallelism with the conveyor. The plate 150 has a set of arms 153, 154, 155, 156 and 157 bolted or otherwise fixed thereon for supporting the flap folding, gumming and sealing devices, and this plate also carries an operating shaft 160 for said devices, said shaft being journalled in bearings 161. The shaft 160 is driven from a shaft 162 which is mounted in bearings 163 in the casing 152, the shaft 162 being driven by a sprocket wheel 164 fixed thereon and connected by a chain 165 to a sprocket wheel 166 of equal size fixed on the shaft 93, so that the shafts 162 and 93 will rotate at equal speed. In order to maintain a driving connection between the shaft 160 which reciprocates with the slide plate 150 and its driving shaft 162 which is stationary, a gear 167 is fixed on the shaft 160 to rotate and reciprocate therewith and an axially elongated gear 168 is fixed on the shaft 162 with which the gear 167 meshes and may move axially thereon while maintaining a driving connection between the shafts 160 and 162, these shafts being driven at the same speed by the gears 167 and 168 which are of equal size.

The envelope flap folding device shown in Figs. 3, 4 and 5, is supported by the arms 153 and 154. It comprises a folding blade 170 which is fixed to the arm 153 and is of a length corresponding approximately to the width of the envelope, a cooperating crimping member 171 having a groove to receive the blade 170, and a clamping member 172, the free end of which is movable into clamping relation with a surface 173 located immediately below the blade 170. The blade 170 occupies a fixed position immediately to one side of the line of edgewise travel of the envelopes in the holders on the conveyor, and is at a height corresponding to the line on which the upstanding flaps on the envelopes in the holders are to be folded. The crimping member 171 is carried on an arm 174 which is mounted to swing on a pivot 175 supported by the arms 153 and 154, the pivot 175 having a crank arm 176 fixed thereto and pivotally connected at 177 to a link 178, the latter being pivotally connected at 179 to a lever 180 pivoted at 181 to the slide plate 150. The lever 180 carries a roller 182 which rides on a cam 183, the latter being fixed on the shaft 160, and a tension spring 184 connected to the lever 180 acts to hold the roll 182 yieldingly against the cam 183. The clamping member 172 is pivotally mounted at 185 on the arms 153 and 154 and has a crank arm 186 fixed thereto. A similar crank arm 187 is fixed to the crimping member 174. A rod 187ᵃ is fixed at one end to a pivot block 188 on the crank arm 186, this rod extending slidably through a pivot block 189 on the crank arm 187, and the opposite end of this rod has a collar 190 fixed thereon, a compression spring 191 encircling the rod between the collar 190 and the pivot block 189. A collar 192 is also fixed on the rod 187ᵃ between the pivot blocks 188 and 189. Normally, the crimping member 171 and clamping member 172 will occupy the relatively retracted positions shown by the dotted lines in Fig. 5, so that the upper end of an envelope in a holder on the conveyor may freely reach a position opposite to the blade 170, after which rotation of the shaft 160 will operate through the lever 180, link 178 and crank arm 176 to rotate the pivot 175. The rotation of the pivot 175 acts to swing the crimping member 171 and clamping member 172 into cooperation with the blade 170 and crimping surface 173 respectively, the clamping member being actuated from the pivot 175 through the compressed spring 191 and rod 187ᵃ but the clamping member 172 will first assume clamping relation with the surface 173 so that it will grip the envelope immediately below the top closing flap thereof and hold it in operative position in relation to the blade 170, and as the rotation of the pivot 175 continues, the crimping member 171 will come into gripping relation with the blade 170, causing the envelope flap which lies between this crimping member and the blade 170 to be sharply crimped along its fold line. The clamping member 172 remains in clamping relation with the surface 173 while the crimping member 171 is cooperating with the blade 170, excess motion of the crank arm 187 connected to the crimping member being compensated for by the spring 191 which will become compressed. Continued rotation of the shaft 160 causes the cam 183 thereon to retract the crimping and clamping members 171 and 172, thereby returning them to the normal dotted line position shown in Fig. 5.

The envelope flap gumming device, shown more particularly in Fig. 6, is supported by the arms 155 and 156. A stationary plate 195 is mounted on the machine at a point in the travel of the conveyor beyond the flap crimping or folding device just described so that the crimped envelope flap c will be carried beneath this plate as it is advanced by the travel of the conveyor. This plate 195 is preferably provided on its underside with a depending flange 196 to prevent deflection of the upper end of the envelope away from the gumming device. The gumming device comprises a comb or series of fingers 197 fixed on a shaft 198 the latter being journalled in the arms 155 and 154, the comb or fingers being adapted to swing downwardly into a receptacle 199 containing gum or other suitable adhesive, as indicated by the dotted lines in Fig. 6, thereby receiving gum or adhesive, and to swing upwardly toward the underside of the plate 195 as shown by the full lines in Fig. 6, and thereby applying the gum or adhesive to the underside of the folded envelope flap c which underlies this plate. In order to prevent excess pressure of the gum applying comb or fingers against the envelope flap, the portion of the plate 195 in the path of the comb or fingers is preferably provided with a slot 200 into which the portion of the envelope flap engaged by the comb or fingers may yield. The shaft 198 carrying the gum applying comb is rotated at appropriate times by a crank 201 which is fixed to the shaft 198 and is pivotally connected at 202 to a link 203, the latter being pivotally connected at 204 to a lever 205 pivoted at 206 on the arm 155, the lower end of this lever carrying a roller 207 which cooperates with a cam 208 fixed on the shaft 160, said roller being held in engagement with its cam by a tension spring 209 which is attached to the link 203.

The gum or adhesive applying comb 197 is preferably mounted removably so that it may be readily removed for cleaning or other purposes. As shown in detail in Fig. 6ᵃ, the comb 197 is formed with a hub 210 having a short shaft 211 fixed therein as by a set screw 212, the shaft 198 projecting into the bore of the hub 210 and having a detachable clutch connection 216 with the shaft 211. The other end of the shaft 211 extends only partially through the hub 210 and abuts against a shaft 198ᵃ which has a collar 213 fixed thereon as by a set screw 214, this collar bearing against the adjacent end of the hub 210 under the action of a coiled compression spring 215 which encircles the shaft 198ᵃ and bears at its other end against the arm 156, the shaft 198ᵃ being slidable in this arm. By this construction, the spring pressed shaft 198ᵃ will normally hold the hub 210 in its proper operative position and will maintain the shaft 211 in clutched engagement with the operating shaft 198 but the hub 210 and the comb or adhesive applying fingers 197 may be readily removed by retracting the shaft 198ᵃ and collar 213 sufficiently to withdraw said shaft from the bore in the hub 210 and to disengage the opposite end of this hub from the end of the shaft 198, the hub 210 and comb 197 being then free for removal.

The envelope flap sealing device shown in detail in Fig. 7, is located beyond the gumming device along the path of travel of the envelopes in the holders on the conveyor. It comprises a pair of compressing members 220 and 221, the compressing member 220 being mounted in fixed position on the arms 156 and 157 in a position at one side of and immediately adjacent to the path of travel of the upper ends of the envelopes, it being of a length substantially equal to the width of the envelopes and it contains an electrical heating unit 222 for heating the gum or adhesive previously applied to the envelope flap by the gumming device and thereby drying the adhesive. The compressing member 221 which is located at the opposite side of the path of travel of the upper ends of the envelopes and is of a length substantially equal to the width thereof, is supported by arms 223 which are fixed to a shaft 224, the latter being journalled in the supporting arms 156 and 157, the arms 223 supporting a plate 225 to which the compression member 221 is connected yieldingly by a threaded stem 226 which is fixed to the member 221 and extends loosely through the plate 225. A coiled compression spring 227 encircles the stem 226 and is interposed between the compression member 221 and the plate 225, and lock nuts 228 are threaded on the stem 226 behind the plate 225 and serve to adjust the position of the compression member 221 relatively to the plate 225. The shaft 224 which carries the compression member 221 and its supporting plate 225 has a lever 229 fixed thereto and this lever is pivotally connected at 230 to a link 231, the latter being pivotally connected at 232 to a lever 233 which is pivoted at 234 to the slide plate 150, the lever 233 carrying a roller 235 which cooperates with a cam 236 fixed on the shaft 160, said roller being held in contact with said cam by a spring 237 attached to the lever 233. Normally, the compression member 221 will occupy the retracted position shown by the dotted lines in Fig. 7 so that the upper end of an envelope having the previously gummed folding flap thereon may enter between the members 220 and 221, after which the rotation of the shaft 160 brings the cam 236 into a position to cause the shaft 224 to rock and carry the compression member 221 toward the cooperative stationary compression member 220, and when the member 221 reaches the full line position shown in Fig. 7, it firmly but yieldingly presses the gummed flap on the upper end of the envelope against the body portion thereof, the spring 227 insuring the proper degree of pressure and avoiding excess pressure, and while the gummed envelope is thus compressed against the body of the envelope, the heat applied to the compression member 220 by the heating unit 222 therein serves to quickly dry the adhesive and thus affix or seal the closed flap on the envelope.

As previously stated the envelope flap folding, gumming and sealing devices are all carried by the reciprocatory slide plate 150 which is movable in parallelism with the conveyor having the holders thereon which advance the envelopes edgewise, and means is provided for moving the slide plate 150 and the flap folding, gumming and sealing devices at the same speed at which the envelopes are being advanced by the conveyor while the flap folding, gumming and sealing operations are being performed. Such concurrent travel of the slide plate 150 with that of the conveyor is accomplished preferably by a cam 240 of cylindrical form fixed on the shaft 160 which travels with the slide plate 150, this cam having a cam groove 241 therein in which operates a roller 242 which is journalled in a support 243 fixed to or forming a part of the stationary casing 152. The cam groove 241 is of such shape and the cam 240 is so set on the shaft 160 as to cause the slide plate 150 to advance with the conveyor and at the same speed at which it travels while the flap folding, gumming and sealing devices are acting upon envelopes in holders on the conveyor, it being understood that the shaft 160 on which the cam 240 is fixed is mounted in bearings on the slide plate 150 which prevent endwise displacement of this shaft on said plate so that axial movement of the cam 240 in consequence of the engagement of its groove 241 with the stationary roller 242 will cause reciprocation of the shaft 160 and the slide plate 150 in unison. It is to be understood that the flap folding, gumming and sealing devices are so spaced in relation to the longitudinal spacing of the envelope holders on the conveyor that the flap folding device will operate to fold or crimp the flap of an envelope in one holder on the conveyor while the gumming device will simultaneously operate to apply gum or adhesive to the folded flap on another or adjacent envelope in another holder on the conveyor and while the sealing device is simultaneously acting to seal or affix the previously gummed flap on another envelope in another holder on the conveyor, or in other words, the flap folding, gumming and sealing devices operate concurrently during each advance of the slide plate in unison with the travel of the conveyor to simultaneously perform flap folding, gumming and sealing operations upon different envelopes while they are being advanced by the conveyor.

After the envelopes have been advanced by the conveyor beyond the flap folding, gumming and sealing devices, the filled and sealed envelopes are transferred successively to a carrier which maintains the flaps in sealed condition while conducting them to a feeding device which directs the filled and sealed envelopes to a magazine for stacking therein. The carrier device shown in the present instance is similar to that disclosed in my prior application Serial No. 756,355, it comprising, as shown in Figs. 12 and 16, an endless chain 245 which is mounted to travel over a pair of sprocket wheels 246 and 247 fixed on shafts 248 and 249 supported in bearing brackets 250 and 251 mounted on the table 1. The links of the chain 245 carry gripping members 252 and 253 which while traveling around the sprocket wheels, are relatively separated but which while traveling along the lower straight side of the chain, are in relatively closed relation so that they will grip and maintain sealing pressure upon the gummed and closed flaps on the upper ends of the envelopes, rails 254 being provided along which the grippers travel at the underside of the chain for maintaining the gripping members in gripping relation with the envelope flaps. The shaft 248 of the sprocket wheel 246 is located above the path of travel of the arms 130 of the envelope holders on the conveyor, as shown in Fig. 16, so that each envelope as it is advanced edgewise by the conveyor will be brought into a position between adjacent grippers 252 and 253 which at that time are about to leave the sprocket wheel 246, so that these grippers will close upon the upper flap carrying end of the envelope. In order to insure the removal of each filled and sealed envelope from its holder on the traveling conveyor, an ejector is provided, as shown in Fig. 11. This ejector comprises an ejector plate 255 which is fixed to a bar 256, the latter being mounted adjustably by longitudinal slots 257 in said bar and screws 258, upon a bracket 259, this bracket being fixed to a bar 260, so that the position of the ejector plate 255 longitudinally of the bar 260 may be adjusted. The bar 260 is pivotally connected at 261 and 262 to a pair of links 263 and 264, and these links are pivotally mounted at 265 and 266 upon a supporting bracket 267 bolted or otherwise secured to the top of the table 1, the links 263 and 264 being preferably of equal length and guiding the bar 260 and ejector plate 255 for reciprocation in substantially a straight line. The bar 260 and ejector plate 255 are reciprocated in appropriately timed relation to the arrival of each envelope at the ejecting position by a lever 268 which is pivotally mounted at 269 on a bracket 270 bolted or otherwise fixed to the top of the table 1, this lever being pivotally connected at 271 to a link 272, said link being connected to the pivot 262, the lever 268 carrying a roller 273 which operates in a groove 274 of appropriate form in a cam 275, this cam being fixed on a shaft 276 which is journalled in suitable bearings 277 and 278 supported respectively on the table 1 and on a plate 279, the latter being supported in fixed position above the table by the frame 2 at one end and a bracket 280 at its other end. The shaft 276 is driven at appropriate speed from a shaft 281 supported in bearings 282 by bevel gears 283, the shaft 281 being driven by a sprocket wheel 284 fixed thereon and a chain 285 which cooperates with said sprocket wheel and with a sprocket wheel 286 fixed on the shaft 65, the arrangement being such that the ejector plate 255 will reciprocate between the arms 130 of an envelope holder on the traveling conveyor when such holder reaches the envelope ejecting position below the sprocket wheel 246 and will be retracted, during each revolution of the shaft 276. As each envelope holder on the traveling conveyor reaches ejecting position, the rollers 134 on the holder will ride upon a pair of cams 135ª which are located on the rails 129 at or adjacent to the envelope ejecting position whereby the arms 130 of the envelope holder will be opened or spread apart to facilitate the ejection of the envelope therefrom.

As will be seen from Fig. 16, the envelope ejecting plate 255 operates in a plane above the top of the envelope holder so that it will engage the part of the envelope which projects above the holder, and in so doing, it will deflect the upper end of the envelope into a position where it will enter between adjacent grippers 252 and 253 on the carrier while such grippers are in relatively opened position and immediately before they close. Means is provided for advancing the chain 245 of the carrier immediately after the upper flap carrying end of an envelope has been thus introduced between adjacent grippers thereon, whereby the upper end and closing flap of such envelope will be gripped and advanced by the carrier. For this purpose, a disk 290 is fixed on the shaft 248 to which the sprocket wheel 246 is fixed, this disk having an annular series of pins 291 fixed thereon and projecting from a side thereof in appropriately spaced relation, and a pawl 292 is provided, this pawl having a dog 293 thereon which is engageable successively with the pins 291 as the pawl is reciprocated. The pawl 292 is pivotally connected at 294 to a lever 295, the latter being pivoted at 296 on a bracket 297 supported in fixed position on the table, the upper end of this lever carrying a roller 298 which rides upon a cam 299. A tension spring 300 connects the lever 295 and pawl 292, it serving to hold the free end of the pawl against the actuating pins 291 on the disk 290 and to also hold the roller 298 on the lever 295 in contact with the cam 299. Said cam is fixed on the shaft 281 so that it will be rotated thereby. The disk 290 has ratchet teeth 301 formed in its periphery with which a spring pressed dog 302 cooperates to prevent backward motion of the carrier chain 245 after each advance thereof.

The filled and sealed envelopes ejected successively from the holders on the traveling conveyor and introduced between the grippers of the carrier are advanced by the latter while suspended therefrom and while their upper ends and closing flaps are clamped firmly between the grippers of the carrier, as shown in Fig. 16, until the envelopes reach a position beneath the sprocket wheel 247. As the envelopes reach this position, the grippers 252 and 253 of the carrier begin to pass around the sprocket wheel 247, in consequence of which the grippers are opened or relatively separated, and the envelopes are thus released from the carrier and dropped by gravity into a feeding device for an envelope stacking magazine, shown particularly in Figs. 16 to 20 inclusive. This feeding device comprises an inclined chute 305 which is suitably supported in fixed position on the machine as by a bracket 306. In order to insure the removal of any bag that may tend to adhere to the grippers of the carrier when such bag reaches the discharge point, a plate 307 is provided which is mounted to reciprocate with the flap folding, gumming and sealing devices, it being mounted for example on a bracket 308 which may be fixed to the arm 157 (Figs. 3 and 4) and attached adjustably to said bracket by a clamping screw 309 extending through a slot 310 in the plate 307 so that the latter may be adjusted in the direction of its reciprocation. A stationary stop 311 is also provided adjacent to the point of discharge of the envelopes from the carrier, this stop being fixed to a side of the bracket 251 so that it will be in the path of the lower portions of the envelopes suspended from the carrier as the envelopes reach the discharge point. By this arrangement, as each envelope reaches the discharge point on the carrier it will be released by the opening of the grippers thereof and the lower portion of the envelope will come against the stop 311. If the envelope is released freely by the grippers of the carrier, it will immediately drop by gravity edgewise into the chute 305. However, if adhesive on the flap or upper portion of the envelope causes it to adhere to either of the grippers 252 and 253 of the carrier so that such envelope is not released the advancing stroke of the plate 307 which is timed to take place at this time, will strike the adhering envelope and thereby free it from the carrier, thus avoiding clogging of the carrier which might otherwise occur.

Each filled and sealed envelope, as it drops into the chute 305 is temporarily detained by a pair of fingers 315 which are fixed on a rock shaft 316 rotatably mounted in bearings 317 on the sides of the chute, the shaft 316 having a crank 318 fixed thereon and pivotally connected at 319 to a link 320, a tension spring 321 being connected to said link and acting to lift it and thereby swing the fingers 315 into contact with the bottom of the chute 305 so that they will intercept and temporarily hold an envelope introduced therein. The link 320 is guided in its vertical movements by a link 322 which is pivotally connected thereto at 323 and is pivotally connected to the stationary frame of the machine at 324, and the lower end of the link 320 is curved or bent as at 325, to provide an actuating portion for lowering it, as will be hereinafter described. The lower portion of the chute 305 is curved to form a substantially horizontal terminal portion 326, this end of the chute being closed by an end wall 327 which serves to arrest the movement of each envelope as it reaches the lower end of the chute, and this lower portion of the chute is provided with slots 328 through which an envelope lifter 329 reciprocates vertically. The envelope lifter, which is preferably of yoke shape in form to provide a pair of laterally spaced wings 330 and envelope supporting lugs 331 at the upper corners thereof, is of a shape to reciprocate upwardly through the slots 328 in the bottom of the envelope chute, and it is fixed as by a clamping screw 332 to the upper end of a plunger 333, the latter being mounted to reciprocate vertically in a stationary guide 334 mounted on a stationary part of the machine frame and is operatively connected by a link 335 to an operating crank 336, the latter being fixed on a shaft 337 mounted in a bearing 338 fixed on the frame of the machine, this shaft being driven by a sprocket wheel 339 fixed thereon and connected to a sprocket wheel 340 of equal size fixed on the shaft 93, by a connecting chain 341 so that during each revolution of the shaft 337 or of the shaft 93 from which it is driven, the crank 336 will lift the envelope lifter 329 through the slots 328 in the lower portion of the envelope chute and will lift an envelope therefrom, and then descend to its normal lowered position, as shown in Fig. 20. The bar or plunger 333 also carries an arm 345 which is fixed to project laterally therefrom and beyond the envelope lifter into a position where it will strike the lower end 325 of the link 320 and lower this link each time the envelope lifter is lowered or returned to its normal position, and such lowering of the link 320 will rotate the shaft 316 in a direction to retract the fingers 315 from the bottom of the envelope chute and thereby release an envelope retained thereby so that this envelope may descend by gravity to the lower end of the chute in a position above the slots 328 therein so that this envelope will be lifted out of the chute by the following ascent of the lifter 329. The fingers 315 thus controlled by the operation of the envelope lifter, insure the feeding of the envelopes one at a time to the envelope lifting position.

The present invention provides a magazine having a plurality of chambers therein into each of which a predetermined or counted number of filled and sealed envelopes is introduced to form a stack, the envelopes being automatically introduced into another chamber in the magazine after each chamber therein has received the predetermined or counted number of envelopes. This part of the machine which is shown particularly in Figs. 16 and 17 and 19 to 25 inclusive, comprises a magazine 350 which is mounted to rotate on a vertical axis by a shaft 351, the upper end of which is supported by a bracket 352 mounted on the table of the machine, the lower end of the shaft 351 being supported by a bracket 353 which extends outwardly from the frame of the machine, the magazine being rotatably mounted on the shaft 351 by bearings 354 and supported by a suitable thrust bearing 355 which rests on the bracket 353. The magazine contains an annular series of vertically extending chambers or pockets 356 which extend from the bottom to the top thereof, each of these chambers being of a cross section corresponding substantially in size and shape to that of the envelopes. These chambers are open at the bottom of the magazine for the reception of the envelopes, and in order to permit the envelopes to be introduced successively into each chamber and to support or retain a stack of envelopes therein, the bottom of each of these chambers, as shown in Fig. 17, is provided at its opposite sides with a pair of envelope retaining members 357 which are pivoted on shafts 358 mounted on the bottom of the magazine and are provided with springs 359 which act to normally but yieldingly swing these members inwardly into envelope supporting and retaining position. The lower ends of these members are provided with lugs 360 arranged to engage the lower edges of bars 361 fixed to the bottom of the magazine so that the members 357 may support the weight of a stack of envelopes in the magazine chamber. When the magazine is rotated into a position to bring a chamber 356 therein directly above the envelope lifter 329 and the lower end of the envelope chute 305, the ascent of the envelope lifter will carry an envelope thereon upwardly between the retaining members 357, spreading them apart so as to admit the envelope to the magazine chamber 356, and to lift the stack of envelopes in the chamber upwardly from the members 357, and when the lifter 329 descends, the envelope thus introduced into the magazine chamber as well as those in the stack above it, will come to rest on the retaining members 357 which swing inwardly or into envelope supporting position as the lifter 329 descends or returns to its normal lowered position.

The magazine is rotated step by step as each chamber therein receives a predetermined or counted number of the envelopes and it is retained successively in positions where the chambers therein are alined with the envelope lifter 329. The means for thus rotating and positioning the magazine comprises a Geneva plate 365 which is fixed to the lower end of a sleeve 366 the latter being fixed to the magazine, this Geneva plate having notches 367 therein of a number corresponding to the number of envelope chambers in the magazine, the periphery of the plate having concave portions 368 intervening the notches, and an actuating member 369 splined on a shaft 370, the latter being mounted in bearings 371 and 372 supported on the frame of the machine, the crank 369 carrying a roller 373 which, when the crank is shifted upwardly on the shaft 370, will be engageable in one of the notches 367 in the Geneva plate 365, and rotation of the crank will rotate the Geneva plate a step to carry a filled chamber in the magazine out of envelope receiving position and to bring another chamber in the magazine into envelope receiving position. The magazine is held against rotation while any chamber therein is in envelope receiving position by a cylindrical locking member 374 which is shiftable vertically on the shaft 370 and rotates with the crank 369, the upper portion of the periphery of the member 374 being continuous and the lower portion of its periphery having a gap or cut-away portion 375 therein. Accordingly, while the crank 369 and locking member 374 occupy their normal lowered position on the shaft 370 as shown in Fig. 19, the continuous or interrupted upper portion of the periphery of the locking member 374 will be presented to one of the concave peripheral portions 368 of the Geneva plate, thereby locking the latter and the magazine against rotation, and the roller 373 of the crank 369 will operate in a path below the Geneva plate and hence will not rotate it, but when the crank 369 and locking member 374 are shifted upwardly on the shaft 370, the roller 373 on the crank will enter one of the notches 367 in the Geneva plate and will rotate it one step, the notch or cut-away portion 375 in the lower portion of the periphery of the member 374 being then opposite to the periphery of the Geneva plate, as shown in Fig. 25 thus unlocking the latter and permitting its rotation.

The shaft 370 which operates the Geneva motion just described is driven by bevel gears 380 from a shaft 381, the latter being mounted in bearings 382 supported on the stationary frame of the machine, and this shaft has a gear 383 which is fixed thereon and meshes with a gear 384 the latter being fixed on a shaft 385. The latter shaft has a cam 386 fixed thereon, this cam having a groove 387 in which a roller 388 on a lever 389 operates, said lever being pivoted at 390 to a stationary part of the machine frame and carrying at its free end a fork 391 having pins 392 thereon which engage in a grooved collar 393 forming part of the crank 369. The cam groove 387 is of such shape that during each revolution of the shaft 385, the lever 389 will be lifted from the full line position shown in Fig. 24 to the dotted line position shown in that figure, thereby lifting the crank 369 into operating relation with the Geneva plate 365 and carrying the locking member 374 into unlocking relation therewith, so that the magazine will be rotated one step, after which the lever 389 returns to its full line position, Fig. 24, thus carrying the crank 369 out of operating relation with the Geneva plate and returning the member 374 to locking relation therewith. Preferably, the gear 384 which drives the cam 387, is of larger diameter than that of the gear 383 on the shaft 381, so that the magazine will not be rotated until after the shaft 381 has made a plurality of revolutions, the gears 384 and 383 being shown in the present instance as having a two to one ratio.

The present invention provides relatively simple but dependable means for counting the number of envelopes actually fed to the magazine, it embodying counting means which will not perform a counting operation unless an envelope is actually fed. Such counting means is shown more particularly in Figs. 16 and 19 and 21 to 25 inclusive. It comprises a pair of disks 400 and 401 both of which are mounted on the shaft 381, the disk 401 being fixed on this shaft but the disk 400 being loosely rotatable thereon. The disk 401 is provided in its periphery with a predetermined number of notches 402 spaced equally around its circumference, and a pawl 403 carried by a bell crank 404 mounted rotatably on the shaft 381, is engageable successively with these notches, under the action of its spring 405, under the control however of the disk 400. A detent 406 is provided to engage successively in the notches 402 of the disk 401 and thereby prevent backward rotation thereof. The disk 400 is of larger diameter than that of the disk 401 and it is provided in its periphery with notches preferably of a number corresponding with those in the disk 401, one of the notches 407 in the disk 400 extending to the full depth of each of the notches 402 in the disk 401 but the rest of the notches 408 in the disk 400 being shallower and of such depth that the bottoms thereof are located outwardly beyond the unnotched periphery of the disk 401. A detent 409 is arranged to cooperate with the notches in the disk 401 and thereby prevent backward rotation after each actuation thereof. By this arrangement, when the pawl 403 engages in one of the shallow notches 408 in the disk 400 it will be held out of engagement with a notch in the disk 401, so that actuation or swing of the pawl 403 will rotate the loosely mounted disk 400 but will not rotate the disk 401, and the disk 400 will be successively rotated, step by step, by successive actuations of the pawl 403 until the latter reaches the relatively deeper notch 407 in the disk 400 whereupon the pawl will engage this notch in the disk 400 and also a registering notch 402 in the disk 401, and actuation of the pawl will then cause the disk 401 as well as the disk 400 to be rotated a step. Any desired number of shallow grooves may be provided in the disk 400 according to any desired number of actuations thereof before rotating the disk 401 a step. For example by providing four of the shallow notches 408 in the disk 400 and one deep notch 407 therein, five actuations of the pawl 403 will take place for each step in the advance of the disk 401. It will also be understood that the number of notches in the disk 401 may be varied as desired, according to the number of actuations of the pawl required to effect each revolution of the shaft 381. By providing each of the disks 401 with five notches as shown, five actuations of the disk 400 will actuate the disk 401 one-fifth of a revolution and a complete revolution of the disk 401 will require twenty-five actuations of the disk 400 by the pawl 403. By connecting the shafts 381 and 385 by the two to one gears as described, the magazine will receive fifty envelopes in each chamber therein before it is rotated to bring another chamber into envelope receiving position. The pawl 403 is actuated or swung at appropriate intervals about the axis of the disks 400 and 401 by a rod 411 which is pivotally connected to the bell crank 404 and operatively connected to a crank 412 which is fixed to the shaft 93.

The counting mechanism just described is controlled according to the presence or absence of an envelope ready to be fed to the magazine, the means for so controlling the counting mechanism being shown particularly in Figs. 16 and 21 to 25 inclusive. Such control means as shown in these figures comprises a pawl 415 which is pivoted at 416 on a bracket 417 fixed to the stationary frame of the machine, this pawl having a downwardly curved forward end 418 which is movable about the pivot 416 either downwardly into a position in the path of a pin 419 which projects from one side of the actuating pawl 403 during the retracting strokes thereof, as indicated by the full lines in Fig. 21 or as shown in Fig. 22 so that the pawl 403 will be lifted out of engagement with the disk 400 during the retracting strokes of said pawl, or is movable upwardly into the dotted line position shown in Fig. 21 or the full line position shown in Fig. 23, where it will be clear of or above the path of the pin 419 during the retracting strokes of the pawl 403 so that the latter may remain in contact with the disk 400. A guard 420 is attached rigidly to the bracket 417 and extends toward the free end 418 of the pawl 415 in a position immediately above the path of the pin 419 on the pawl 403 during retraction of the latter while in engagement with the disk 400, this guard having a portion 421 on which the pawl 415 may rest and thus be supported when the pawl 415 is in its relatively lower position. An arm 422 is fixed to the pawl 415 so that it will swing in unison therewith about the pivot 416, the upper end of this arm being arranged to abut against a stop 423 fixed on a bracket 424, the latter being fixed to the stationary frame of the machine, abutting of the arm 422 against the stop 423 limiting the downward movement of the pawl 415, and a tension spring 425 connects the arm 422 to the bracket 424 and serves to normally and yieldingly hold said arm against said stop. The upper end of the arm 422 carries a rod 426, the free end of which is bent upwardly, as at 427 to extend through a slot 428 formed in the bottom of the envelope chute 305 (Fig. 20), and the extremity of this rod is bent downwardly to form a finger 429 which extends somewhat below the bottom of the envelope chute so that it will engage an envelope lying on the bottom of the chute and resting against the end wall 327. A plunger 430 is mounted to reciprocate vertically in a guide 431 fixed to the stationary frame of the machine, this plunger having a roller 432 on its lower end which rides on a cam 433 of suitable form fixed on the shaft 337 so that this plunger will be lifted and lowered during each revolution of the shaft 337 which elevates and lowers the envelope lifter 329. The upper end of the plunger 430 is provided with a toe 434 which is arranged to engage and press against the underside of a portion 435 on the pawl 415, to swing the latter into its upper or dotted line position shown in Fig. 21 each time the shaft 337 revolves and prior to each retracting stroke of the pawl 403, the cam 433 being so set on the shaft 337 as to cause the pawl 415 to be lifted during each descent of the envelope lifter 329.

By this arrangement each time the envelope lifter descends, the portion of the rod 426 which operates through the slot 428 in the bottom of the envelope chute will be retracted from the chute and the path of the envelopes descending therein, during each descent of the envelope lifter 329, by the engagement of the finger 345 with the lower end of the link 320, which lowers this link and swings the retaining fingers 315 outwardly away from the chute and thereby releases an envelope for descent therein. The envelope thus released drops by gravity in the chute until its forward or bottom edge strikes the chute end wall 327, the envelope being then positioned above the slots 328 through which the envelope lifter 329 operates. If an envelope is thus positioned in the bottom of the chute, the finger 429 will swing against the trailing or upper edge of the envelope, under the action of the spring 425, as the rotation of the cam 433 continues, and although the shape of this cam is such that at this time the plunger 430 descends and hence no longer supports the pawl 415 in its upper position, the engagement of the finger 429 against the envelope will retain the rod 426 and finger 429 in relatively retracted position, thereby holding the pawl 415 in its elevated position as shown by the dotted lines in Fig. 21, where it will be above or clear of the path of travel of the pin 419 on the pawl 403, so that during the retracting stroke of the pawl 403 which then takes place, this pawl is permitted to remain in engagement with the periphery of the disk 400 so that, upon completion of its retracting stroke, it will engage in the next notch in the disk 400 as shown in Fig. 23, and the pawl 403 will therefore advance the disk 400 on its next following actuating stroke. However, if an envelope fails to feed into lifting position at the bottom of the envelope chute 305, the rod 426 and finger 429, upon their return stroke following lifting thereof by the plunger 430, will be free to swing until the arm 422 comes against the stop 423, the pawl 415 being thus allowed to descend until it rests on the guard 420, the downwardly curved free end of the pawl 415 then occupying a position in the path of the pin 419 on the pawl 403 during the retracting stroke of the latter, as shown in Fig. 22, and consequently, as the pawl 403 is retracted, the pin 419 will ride up over the free end of the pawl 415 and onto the guard 420, the pawl 403 being thus disengaged from the disk 400 so that it will not engage the next notch in said disk, with the result that the next actuating stroke of the pawl 403 will be idle or will not advance the disk 400. The disks 400 and 401 of the counting mechanism are thus controlled in their counting operation or actuation according to the presence or absence of an envelope ready for introduction into the magazine, each filled envelope actually fed by the envelope chute being counted but the counting mechanism remaining idle or without actuation in the event a filled envelope fails to feed into position for introduction into the magazine.

By providing the disk 400 with five peripheral notches, one deeper than the rest and providing the disk 401 with five notches, it will be understood that each time the disk 400 is actuated or advanced through five steps by five strokes or actuations of the pawl 403, the disk 401 will be advanced one step or one-fifth of a revolution, so that twenty-five actuations of the pawl 403 will rotate the shaft 381 to which the disk 401 is fixed, through one revolution. By connecting the shaft 385 carrying the cam 386 to the shaft 381 by gears 384 and 383 having a ratio of two to one, the crank 369 and locking member 374 which control the actuation of the Geneva plate 365 fixed to the magazine will be lifted after fifty actuations or working strokes of the pawl 403 have taken place, so that the magazine will be rotated to carry one chamber therein out of envelope receiving position, after fifty envelopes have been introduced therein and to bring another empty chamber therein into envelope receiving position.

By fitting box-like receptacles 440, open at the bottom and slotted at the front removably into chambers of the magazine 350, the filled and sealed envelopes will be introduced into such receptacles and after each receptacle has been filled and rotation of the magazine carries it out of filling position, the stack of envelopes introduced into each chamber of the magazine can be readily removed from the magazine manually by withdrawing the receptacle containing the envelopes from the chamber in the magazine, as by sliding the receptacle upwardly out of the chamber, radial displacement of the receptacles from the magazine being prevented by overlying plates 441 which are fixed to the periphery of the magazine and overlie the edges of the receptacles.

The machine may be driven from any suitable source of power, such for example as an electric motor 450, the shaft of which may be coupled to a shaft 451 having a gear 452 fixed thereon for driving the vacuum pump 69 and having a worm 453 fixed thereon for driving a worm wheel 454, the shaft 451 being conveniently mounted in the casing 455 of the vacuum pump and worm wheel 454 driving a sprocket wheel 456 which is connected by a chain 457 to a sprocket wheel 458 fixed on the shaft 95, the latter being connected by the gears 94 and 96 to the shafts 93 and 97 from which the various mechanisms of the machine are driven. The sprocket wheel 456 may be clutched and unclutched with respect to the shaft 459 to which the worm wheel 454 is fixed, by a suitable clutch 460, which is preferably of the construction disclosed in my prior application Serial No. 719,393, this clutch being manually engaged or disengaged to start and stop the operation of the machine, by a suitably located control lever 461.

The operation of the different mechanisms of the machine having been described in conjunction with the descriptions of the constructions thereof, the general operation of the machine may be briefly described as follows.

Assuming the hopper 8 contains a supply of the pills or like articles and the cut-off slide 28 is retracted so that the pills rest on the rotatable disk 12, that a supply of envelopes having open closing flaps projecting from their upper ends is contained in the envelope magazine 50, and that the machine is set into operation and is being driven continuously by the electric motor 450 or other suitable source of power, all of the shafts of the machine will be driven continuously and the traveling conveyor 120 carrying the envelope holders will also be caused to travel continuously.

The pills in the hopper 8 will drop into and fill the pockets 16 in the pill counting plate 13 while the same is beneath that portion of the hopper in which the pills are contained, and rotation of the disk 12 carrying the pill counting plate will bring this plate above the discharge opening 20, whereupon the pockets in this counting plate will be carried out of communication with the pill containing portion of the hopper and the pills contained in this plate will drop by gravity therefrom through the discharge opening 20 into the filling tube 30, which, at this time is in its elevated position, as shown in Fig. 2. During the rotation of the pill carrying plate into discharging position, the suction cups 55 at which a vacuum or suction action is produced through the operation of the pump 69, are advanced into engagement with the exposed side of the foremost envelope standing in vertical position at the discharge opening in the envelope magazine 50, the envelope becoming thereby attached to the suction cups, and these suction cups are then retracted to a position where they bring the envelope attached thereto beneath the elevated filling tube 30, whereupon the retraction of the suction cups ceases temporarily. Since the upstanding closing flap c on the envelope is on the side thereof opposite to that engaged by the suction cups, as shown in Fig. 27, the side of the envelope engaged by the suction cups will pass beneath the lower end of the filling tube 30 and the closing flap c on the envelopes will come against the side of the filling tube near its lower end, the lower end of the filling tube being preferably bevelled to receive the envelope closing flap as shown in Figs. 2 and 27. The filling tube 30, after an envelope has been thus positioned beneath it, is lowered by the rotation of the cam 40, thus carrying the filling tube into the open upper end of the envelope. While the filling tube 30 is in its elevated pill receiving position, the gate 32 is in its closed position within the tube, as shown in Fig. 2, thereby retaining the pills in the tube, but as the tube descends into the envelope, this gate is opened by the cam 43, thereby releasing the pills received from the counting disk so that they may drop by gravity and as a group or charge into the envelope. While the envelope is in pill receiving position it is centered by the guides 81 which are then in relatively closed position adjacent to the vertical edges of the envelope, and the envelope is supported by the suction cups 55 which then exert a suction thereon, the suction action of the cups 55 serving to hold the envelope open beneath the filling tube and to support it until it receives the pills therefrom.

After the envelope has received a charge or supply of pills from the filling tube, the suction action on the suction cups 55 is broken or interrupted by actuation of the plunger 72 of the valve 67 by the lever 76 whereby atmospheric air is admitted to the tube 56 to which the suction cups are attached, and the envelope thereby released and containing the pills drops edgewise by gravity between the guides 81 and comes to rest on the shelves 81' below the lower ends of these guides. As the continuously traveling conveyor 120 brings an envelope holder substantially opposite to the envelope resting between the guides 81, the ejector plate 105 is advanced from the full line position shown in Fig. 13 to the dotted line position shown in that figure, under the action of the cam 113, and the guides 81, at the same time, are relatively separated, whereby the envelope is ejected laterally or snapped forwardly from the guides 81 and introduced between the arms 130 of the respective holder on the conveyor, these arms of the holder being then held open by the cams 135 on the rails 129 along which the holder travels. The continued rotation of the cam 40 following the introduction of the pills into the envelope restores the filling tube 30 to its raised pill receiving position ready to receive another charge of pills and the cam 64, after retracting the suction cups 55 from the envelope to receive it, is again advanced to remove another envelope from the envelope magazine and to bring it into pill receiving position beneath the filling tube 30.

Each filled envelope, as it is introduced into a holder on the traveling conveyor, is advanced edgewise thereby to bring its upper end opposite to the blade 170 of the flap folding device shown in Figs. 3, 4 and 5 and this flap folding device is advanced, under the action of the cam 240, at the same speed at which the envelope is advanced by the conveyor, and during such advance of the flap folding device, the clamping member 172 thereof is swung against the clamping face 173, thereby gripping the body of the envelope immediately below the fold line of its flap, and immediately thereafter, the folding or crimping member 171 is swung against the upstanding envelope flap thereby crimping or folding it sharply over the blade 170, following which the members 171 and 172 are retracted and the cam 240 returns the flap folding device to its initial position.

The continued advance of the conveyor carries the envelope with its folded flap beneath the plate 195 of the flap gumming device shown in Figs. 3, 4 and 6, and while the advance of the envelope and gumming device continue, the gum applying comb 197 is swung upwardly from the gum or adhesive receptacle 199 against the underside of the flap thereby applying spots of adhesive thereto, after which the gum applying comb 197 is lowered and the gumming device is retracted back to its initial position under the action of the cam 240. The continued advance of the envelope having the folded and gummed flap thereon brings its upper end and gummed flap between the compression members 220 and 221 of the sealing device shown in Figs. 3, 4 and 7, and as the envelope continues its advance and the sealing device is advanced in unison therewith under the action of the cam 240, the compression member 221 is closed upon the gummed envelope flap, compressing it firmly against the compression member 220, the heating unit 222 of which heats it so as to quickly dry the gum or adhesive and thus firmly affix or seal the flap in closed position. It should be understood that the flap folding, gumming and sealing devices reciprocate in unison with the travel of the conveyor, under the action of the cam 240 which reciprocates the slide plate 150 carrying these devices, and that while the flap folding device is operating on an envelope in one holder on the conveyor, the gumming device is applying gum or adhesive to the previously folded flap of another envelope in another holder on the conveyor, and the sealing device is sealing or affixing the previously gummed flap of another envelope contained in another holder on the conveyor.

The continued advance of the conveyor brings each sealed envelope in succession between the ejector plate 255, (Fig. 11) and the carrier 245 (Fig. 16), and as each holder brings the sealed envelope into such position, the cams 135ᵃ on the conveyor tracks open the arms 130 of the holder and the ejector plate 255, is advanced by the cam 276 in a direction to push the envelope flatwise from the holder and into the opening between adjacent grippers 252 and 253 on the carrier 245, these grippers being then spread apart at the point of tangency of the lower stretch of the carrier with the sprocket wheel 290 around which it travels. Immediately after an envelope has been thus introduced into the carrier, the latter is advanced so that the grippers close firmly upon the upper end of the envelope and the gummed closing flap thereon, under the action of the pawl 292 (Fig. 12) which receives a stroke from the cam 299 and actuates the ratchet disk 290 through engagement with one of its pins 291.

The filled and sealed envelopes are advanced by the carrier 245 until they reach the point of tangency of the lower stretch of this carrier with the underside of the sprocket wheel 247, whereupon the grippers 252 and 253 of the carrier open or spread apart, and such opening of the carrier grippers releases the foremost envelope so that it drops into the envelope chute 305. If the envelope or the gummed flap thereof tends to adhere to the grippers of the carrier, the plate 305 which advances at this time will detach it therefrom.

Each envelope, as it is released from the carrier and drops into the envelope chute 305, is arrested in its descent therein by the fingers 315 which at this time are swung against the bottom of the chute (Fig. 20), until the envelope lifter 329 approaches its lowermost or retracted position, whereupon the fingers 315 will be swung outwardly away from the chute and the envelope will be permitted to descend by gravity edgewise until its forward edge strikes the transverse end wall 327 at the bottom of the chute, the envelope being then positioned above the slots 328 in the chute through which the envelope lifter 329 operates. During the descent of the envelope, the detector finger 429 is retracted from the bottom of the chute so as to avoid obstructing the descent of the envelope under the control of the cam 433, the finger 429 being shown in such retracted position by the dotted lines in Fig. 21. While the envelope lifter 329 is in its retracted position, the plunger 430 is forced upwardly by the cam 433, thereby lifting the pawl 415 out of the path of the pin 419 on the pawl 403 and simultaneously swinging the finger 429 out of the envelope chute, the pawl 403 being then in its actuated position, and before the pawl 403 is retracted through the action of the crank 412 and link 411, the cam 433 allows the plunger 430 to descend. If an envelope is in position at the bottom of the envelope chute, descent of the pawl 415 into the path of the pin 419 on the pawl 403 will be prevented by engagement of the finger 429 with the rear edge of such envelope, and during retraction of the pawl 403 which then takes place, the pin 419 will pass beneath the pawl 415 and the pawl 403 will engage the next notch in the periphery of the disk 400, ready to advance this disk a step on the next actuating stroke of the pawl 403. If however no envelope is contained in the lower end of the envelope chute, the pawl 415 will be allowed to descend by gravity, following the descent of the plunger 430, so that it will be in the path of the pin 419 on the pawl 403, so that during retraction of the latter, it will be lifted out of engagement with the periphery of the disk 400 and hence will not engage the next notch in its periphery, so that the next following actuating stroke of the pawl 403 will take place idly or without advancing the disk 400.

Immediately after the finger 429 has advanced into engagement with an edge of an envelope in the bottom of the envelope chute, the crank 336 lifts the envelope lifter 329, carrying it through the slots 328 in the bottom of the envelope chute, past the retaining members 357 in the bottom of a chamber in the magazine, and thus introduces the envelope into the bottom of such magazine chamber or at the bottom of a stack of envelopes which may have been previously introduced therein. The magazine at this time is held with the appropriate chamber therein in envelope receiving position by the Geneva plate 365 fixed thereto and the locking member 374 which is then in its lowered position so that it presents its uninterrupted periphery to a locking concavity 368 in the periphery of the Geneva plate.

The pawl 403 is operated on its actuating stroke to advance the disk 40 a step in its rotation for each ascent of the envelope lifter 329, and after the pawl 403 has been actuated a predetermined number of times, as for example fifty times if the disks 400 and 401 are each provided with five peripheral notches and the cam shaft 385 is connected to the shaft 381 by gears having a ratio of two to one, the cam 386 will lift the Geneva plate actuating crank 369 and locking member 374 so that the roller 373 will engage a notch 367 in the periphery of the Geneva plate 365 and rotate the latter one step, the cut-away or interrupted portion 375 of the locking member being then presented to the periphery of the Geneva plate, after which the actuating crank 369 and locking member 374 are lowered so that the Geneva plate will be retained in the position into which it was rotated. Such rotation of the Geneva plate rotates the magazine to which it is fixed to carry the chamber therein which has received the predetermined or counted number of filled and sealed envelopes out of envelope receiving position and to bring the next chamber in the magazine into envelope receiving position, so that the filled and sealed envelopes are formed into stacks in the magazine, each stack containing a predetermined counted number of the envelopes.

I claim as my invention:—

1. In a machine of the class described, the combination of a travelling conveyer having holders thereon for advancing envelopes, means for introducing envelopes into said holders, envelope flap closing means, a slide mounted to travel in parallelism with said conveyer and carrying said flap closing means in a position for operation upon the flap of an envelope in a holder on said conveyer, power means, and means carried by said slide and driven by said power means during the travel of said slide for causing said slide and closing means to travel in unison with the conveyer and the closing means to operate on an envelope thereon.

2. In a machine of the class described, the combinaton of a travelling conveyer having holders thereon for advancing envelopes, means for introducing envelopes into said holders, envelope flap folding means, a slide mounted to travel in parallelism with said conveyer and carrying said flap folding means in a position for operation upon the flap of an envelope in a holder on said conveyer, power means, and means carried by said slide and driven by said power means during the travel of said slide for causing said slide and folding means to travel in unison with the conveyer and said folding means to operate on an envelope thereon.

3. In a machine of the class described, the combination of a travelling conveyer having holders thereon for advancing envelopes, means for introducing envelopes into said holders, envelope flap gumming means, a slide mounted to travel in parallelism with said conveyer and carrying said flap gumming means in a position for operation upon the flap of an envelope in a holder on said conveyer, power means, and means carried by said slide and driven by said power means during the travel of said slide for causing said slide and gumming means to travel in unison with the conveyer and the gumming means to operate on an envelope thereon.

4. In a machine of the class described, the combination of a travelling conveyer having holders thereon for advancing envelopes, means for introducing envelopes into said holders, envelope flap sealing means, a slide mounted to travel in parallelism with said conveyer and carrying said flap sealing means in a position for operation upon the flap of an envelope in a holder on said conveyer, power means, and means carried by said slide and driven by said power means during the travel of the slide for causing said slide and sealing means to travel in unison with the conveyer and the sealing means to operate on an envelope thereon.

5. In a machine of the class described, the combination of a travelling conveyer having holders thereon for advancing envelopes, means for introducing envelopes into the holders on said conveyer, envelope flap folding, gumming and sealing devices to operate on envelopes in the holders on the conveyer, a slide reciprocable in parallelism to the direction of travel of the conveyer and carrying said folding, gumming and sealing devices in a longitudinal row thereon for simultaneous operation on a row of envelopes on the conveyer, and means for causing said slide and said devices thereon to travel in unison with the conveyer.

6. In a machine of the class described, the combination of a travelling conveyer having holders thereon for advancing envelopes, means for introducing envelopes into the holders on said conveyer, envelope flap folding, gumming and sealing devices to operate on envelopes in the holders on the conveyer, a slide carrying said folding, gumming and sealing devices in a longitudinal row thereon for simultaneous operation on a row of envelopes on the conveyer, and also carrying means for simultaneously actuating said devices, and means for moving said slide and said devices thereon in unison with the travel of the conveyer and for concurrently operating the actuating means therefor.

7. In a machine of the class described, the combination of a travelling conveyer carrying holders for advancing envelopes edgewise, envelope flap folding, gumming and sealing devices and operating means therefor, a slide mounted to reciprocate longitudinally of the conveyer and carrying said devices, a cam shaft also carried by said slide and having cams thereon for actuating the operating means for said devices, and means for reciprocating said slide in unison with the travel of the conveyer and for concurrently rotating said cam shaft to cause operation of said devices upon envelopes carried by the conveyer.

8. In a machine of the class described, the combination of a continuously traveling conveyer having holders thereon for advancing envelopes, means for introducing envelopes into said holders, envelope flap closing means, a slide mounted to reciprocate in parallelism with said conveyor and carrying said flap closing means thereon in a position to grip and close the flap of an envelope in a holder on said conveyor, power means, and means carried by said slide and driven by said power means during the reciprocation of the slide for causing said closing means to travel in unison with the conveyor and the closing means to close the flap of an envelope thereon.

9. In a machine of the class described, the combination of a continuously traveling conveyor having holders thereon for advancing envelopes, means for introducing envelopes into said holders, envelope flap folding means, a slide mounted to reciprocate in parallelism with said conveyor and carrying said flap folding means thereon in a position to clamp an envelope in a holder on said conveyor and to crimp and fold the flap thereon, power means, and means driven by said power means for causing said slide and folding means to travel in unison with the conveyor and the folding means to operate on an envelope thereon.

10. In a machine of the class described the combination of a continuously traveling conveyor having holders thereon for advancing envelopes, means for introducing envelopes into said holders, envelope flap gumming means, a slide mounted to reciprocate in parallelism with said conveyor and carrying said flap gumming means thereon, said gumming means being movable laterally of the direction of reciprocation of said slide into engagement with the flap of an envelope in a holder on said conveyor, power means, and means carried by said slide and driven by said power means for causing said slide and gumming means to travel in unison with the conveyor and the gumming means to engage the flap of an envelope thereon.

11. In a machine of the class described, the combination of a continuously traveling conveyor having holders thereon for advancing envelopes, means for introducing envelopes into said holders, envelope flap sealing means, a slide mounted to travel in parallelism with said conveyor and carrying said flap sealing means, the latter being operative to grip and compress the flap and adjacent body portion of an envelope in a holder on said conveyor, power means, and means carried by said slide and driven by said power means for causing said slide and sealing means to travel in unison with the conveyor and the sealing means to grip and compress the flap and adjacent body portion of an envelope thereon.

12. In a machine of the class described, the combination of a continuously traveling conveyor having holders spaced longitudinally thereon for advancing envelopes edgewise in a row, means for introducing envelopes into the holders on said conveyor, envelope flap folding, gumming and sealing devices to operate on a row of envelopes in the holders on the conveyor, a slide reciprocable in parallelism with the direction of travel of the conveyor and carrying said folding, gumming and sealing devices in a longitudinal row thereon, and means for causing said slide and said devices thereon to travel in unison with the conveyor.

13. In a machine of the class described, the combination of a continuously traveling conveyor having holders spaced longitudinally thereon for advancing envelopes edgewise in a row, means for introducing envelopes into the holders on said conveyor, envelope flap folding, gumming and sealing devices to operate on a row of envelopes in the holders on the conveyor, a slide mounted to reciprocate in parallelism with the direction of travel of the conveyor and carrying said folding, gumming and sealing devices in a longitudinal row thereon, and also carrying means for actuating said devices, power means mounted in relatively fixed position on the machine and means driven continuously by said power means for moving said slide and said devices thereon in unison with the travel of the conveyor and for concurrently operating the actuating means therefor to cause the flap folding, gumming and sealing devices to operate simultaneously on a row of envelopes during their continuous advance by the conveyor.

14. In a machine of the class described, the combination of a continuously traveling conveyor carrying holders located at intervals longitudinally thereon for advancing a row of envelopes edgewise, envelope flap folding, gumming and sealing devices and operating means therefor, a slide mounted to reciprocate longitudinally of the conveyor and carrying said devices, a cam shaft also carried by said slide and having cams thereon for actuating the operating means for said devices, and a cam on said cam shaft for reciprocating said slide, and means for rotating said cam shaft to reciprocate said slide in unison with the travel of the conveyor and to concurrently cause operation of said devices simultaneously upon a row of envelopes carried by the conveyor.

JOHN T. DALTON.